US010220351B2

(12) United States Patent
Tuteja et al.

(10) Patent No.: US 10,220,351 B2
(45) Date of Patent: *Mar. 5, 2019

(54) SUPERHYDROPHILIC AND OLEOPHOBIC POROUS MATERIALS AND METHODS FOR MAKING AND USING THE SAME

(71) Applicants: THE REGENTS OF THE UNIVERSITY OF MICHIGAN, Ann Arbor, MI (US); The United States of America, as represented by the Secretary of the Air Force, Washington, DC (US)

(72) Inventors: Anish Tuteja, Ann Arbor, MI (US); Arun Kumar Kota, Ann Arbor, MI (US); Gibum Kwon, Ann Arbor, MI (US); Joseph M. Mabry, Lancaster, CA (US)

(73) Assignees: The Regents of The University of Michigan, Ann Arbor, MI (US); The United States of America, as represented by the Secretary of the Air Force, Washington, DC (US)

( * ) Notice: Subject to any disclaimer, the term of this patent is extended or adjusted under 35 U.S.C. 154(b) by 92 days.

This patent is subject to a terminal disclaimer.

(21) Appl. No.: 14/939,953

(22) Filed: Nov. 12, 2015

(65) Prior Publication Data

US 2016/0129400 A1    May 12, 2016

Related U.S. Application Data

(63) Continuation of application No. 13/159,950, filed on Jun. 14, 2011, now Pat. No. 9,186,631.

(Continued)

(51) Int. Cl.
*B01D 69/02*        (2006.01)
*B01D 69/10*        (2006.01)
(Continued)

(52) U.S. Cl.
CPC .............. *B01D 69/02* (2013.01); *B01D 69/10* (2013.01); *B01D 69/12* (2013.01); *C02F 1/40* (2013.01);
(Continued)

(58) Field of Classification Search
CPC ........ B01D 69/02; B01D 69/12; B01D 69/10; B01D 2325/36; C02F 1/40; B01J 20/22;
(Continued)

(56) References Cited

U.S. PATENT DOCUMENTS 3,891,496 A    6/1975    Erwin
3,922,403 A    11/1975   Sample, Jr. et al.
(Continued)

FOREIGN PATENT DOCUMENTS

WO    2005/068399 A1    7/2005
WO    2009/009185 A2    1/2009
(Continued)

OTHER PUBLICATIONS

Canadian Examination Report and Search Report issued in corresponding Canadian Application No. 2,802,859 dated Jun. 21, 2017.
(Continued)

*Primary Examiner* — Katherine Zalasky
(74) *Attorney, Agent, or Firm* — Harness, Dickey & Pierce, P.L.C.

(57) ABSTRACT

The present disclosure provides a porous material having a surface that is concurrently both superhydrophilic (having a first apparent advancing dynamic contact angle of less than or equal to about 5° for water) and oleophobic (having a second apparent advancing dynamic contact angle of greater than or equal to about 90°) or superoleophobic (a second apparent advancing dynamic contact angle of greater than or equal to about 150° for oil). Such materials can be used in a separator device to separate a liquid-liquid mixture of
(Continued)

Figure 1:
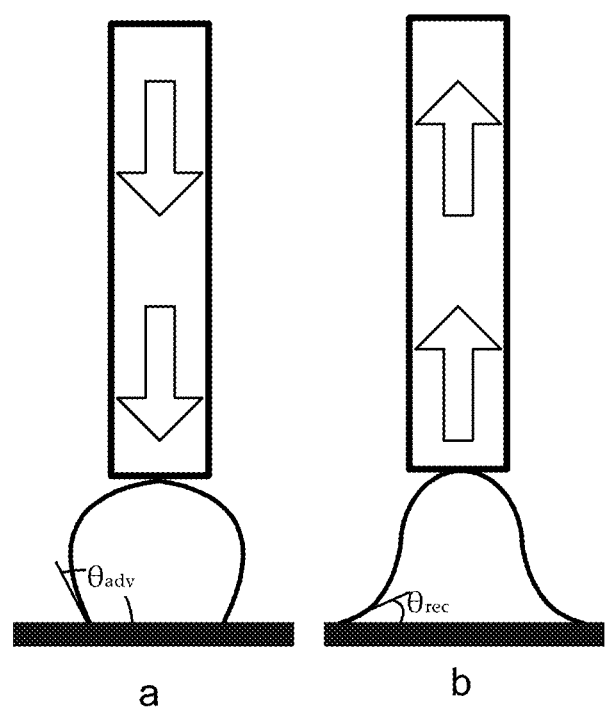

immiscible components (e.g., oil and water) or miscible components (e.g., alcohols). Separation apparatus incorporating such materials and methods of making and using these materials are also provided.

17 Claims, 20 Drawing Sheets

Related U.S. Application Data

(60) Provisional application No. 61/354,522, filed on Jun. 14, 2010.

(51) Int. Cl.
| | | |
|---|---|---|
| *B01D 69/12* | (2006.01) | |
| *C10G 21/00* | (2006.01) | |
| *C10G 31/09* | (2006.01) | |
| *C10G 33/06* | (2006.01) | |
| *C02F 1/40* | (2006.01) | |
| *C02F 1/44* | (2006.01) | |
| *C02F 101/32* | (2006.01) | |

(52) U.S. Cl.
CPC ............... *C02F 1/44* (2013.01); *C10G 21/00* (2013.01); *C10G 31/09* (2013.01); *C10G 33/06* (2013.01); *B01D 2325/36* (2013.01); *C02F 2101/32* (2013.01); *C02F 2101/325* (2013.01); *Y10T 428/249953* (2015.04); *Y10T 428/249978* (2015.04)

(58) Field of Classification Search
CPC ............ B01J 20/28014; B01J 20/28028; B01J 20/28042; B01J 20/28054; B01J 2220/44; B01J 2220/445
See application file for complete search history.

(56) References Cited

U.S. PATENT DOCUMENTS

| | | | |
|---|---|---|---|
| 4,026,874 | A | 5/1977 | Sample, Jr. et al. |
| 4,119,485 | A | 10/1978 | Erwin |
| 4,127,164 | A | 11/1978 | Erwin |
| 4,201,664 | A | 5/1980 | Hekal |
| 4,556,623 | A | 12/1985 | Tamura et al. |
| 5,199,486 | A | 4/1993 | Balmer et al. |
| 5,269,935 | A | 12/1993 | Clough et al. |
| 5,385,175 | A | 1/1995 | Rivero et al. |
| 5,518,610 | A | 5/1996 | Pierpoline |
| 6,716,919 | B2 | 4/2004 | Lichtenhan et al. |
| 7,157,117 | B2 | 1/2007 | Mikhael et al. |
| 7,193,015 | B1 | 3/2007 | Mabry et al. |
| 7,217,683 | B1 | 5/2007 | Blanski et al. |
| 7,695,629 | B2 | 4/2010 | Salamitou et al. |
| 7,868,112 | B2 | 1/2011 | Oikawa et al. |
| 7,897,667 | B2 | 3/2011 | Mabry et al. |
| 8,177,985 | B2 | 5/2012 | Akay et al. |
| 8,227,381 | B2 | 7/2012 | Rodrigues et al. |
| 8,562,839 | B2 | 10/2013 | Cho |
| 9,186,631 | B2 | 11/2015 | Tuteja et al. |
| 9,650,518 | B2 | 5/2017 | Meuler et al. |
| 9,834,459 | B2 | 12/2017 | Tuteja et al. |
| 9,868,911 | B2 | 1/2018 | Reams et al. |
| 2002/0164443 | A1 | 11/2002 | Oles et al. |
| 2004/0067339 | A1* | 4/2004 | Gandon ............ B32B 17/10761 |
| | | | 428/141 |
| 2004/0209139 | A1 | 10/2004 | Extrand |
| 2006/0286555 | A1* | 12/2006 | Van Beuningen ... B01J 19/0046 |
| | | | 435/6.19 |
| 2007/0224391 | A1 | 9/2007 | Krupenkin et al. |
| 2007/0237947 | A1 | 10/2007 | Gleason et al. |
| 2008/0015298 | A1 | 1/2008 | Xiong et al. |
| 2008/0146734 | A1 | 6/2008 | Youngblood et al. |
| 2008/0199805 | A1 | 8/2008 | Rushkin et al. |
| 2008/0314820 | A1 | 12/2008 | Prulhiere et al. |
| 2010/0035070 | A1 | 2/2010 | Moorlag et al. |
| 2010/0050871 | A1 | 3/2010 | Moy et al. |
| 2010/0316842 | A1* | 12/2010 | Tuteja .................... D01D 5/003 |
| | | | 428/143 |
| 2011/0084421 | A1 | 4/2011 | Soane et al. |
| 2011/0229706 | A1* | 9/2011 | Epstein .................. B82Y 30/00 |
| | | | 428/292.1 |
| 2011/0283778 | A1* | 11/2011 | Angelescu ............. B01D 69/02 |
| | | | 73/53.01 |
| 2012/0000853 | A1 | 1/2012 | Tuteja et al. |
| 2012/0160362 | A1 | 6/2012 | Smith et al. |
| 2013/0072609 | A1 | 3/2013 | Haddad et al. |
| 2013/0122225 | A1 | 5/2013 | Azimi et al. |
| 2013/0178568 | A1 | 7/2013 | Meuler et al. |
| 2013/0264287 | A1 | 10/2013 | Zhang et al. |
| 2014/0178641 | A1 | 6/2014 | Leblanc et al. |
| 2014/0290699 | A1 | 10/2014 | Bengaluru Subramanyam et al. |
| 2015/0065674 | A1 | 3/2015 | Ramirez et al. |
| 2015/0109313 | A1 | 4/2015 | Heggelund et al. |
| 2015/0136606 | A1 | 5/2015 | Tuteja et al. |
| 2015/0353813 | A1 | 12/2015 | Guenthner et al. |
| 2016/0129400 | A1 | 5/2016 | Tuteja et al. |

FOREIGN PATENT DOCUMENTS

| | | |
|---|---|---|
| WO | WO2009/009185 A2 | 1/2009 |
| WO | 2010/028752 A1 | 3/2010 |
| WO | 2011/159699 A2 | 12/2011 |
| WO | WO2011/159699 A2 | 12/2011 |
| WO | 2013/173722 A2 | 11/2013 |

OTHER PUBLICATIONS

Adams, Richard. Technology Commercialization Opportunity Polyhedral Oligomeric Silsesquioxanes (POSS): A New Generation of Lighter Weight, Higher Performance Polymeric Materials.pp. 1-3 (Available online Jun. 9, 2010).

Chimuka, Luke, et al., "Why liquid membrane extraction is an attractive alternative in sample preparation," Pure Appl. Chem., vol. 76, No. 4, pp. 707-722 (2004).

Ehrenberg, Rachel, "Filter unmixes oil and water: Combination of chemistry and gravity could help clean spills," Science News, vol. 182, No. 7, p. 17.

Feng, Xinjian, et al., "Design and Creation of Superwetting/Antiwetting Surfaces," Advanced Materials, vol. 18, pp. 3063-3078 (2006).

Kota, Arun K., et al., "Hygro-responsive membranes for effective oil-water separation," Nature Communications, vol. 3, No. 1025, pp. 1-8 (Aug. 28, 2012).

Kota, Arun K., et al., "Superomniphobic surfaces: Design and durability," MRS Bulletin, vol. 38, pp. 383-390 (May 2013).

Kota, Arun K., et al., "The design and applications of superomniphobic surfaces," NPG Asia Materials, vol. 6, No. e109, pp. 1-16 (2014).

Kwon, Gibum et al. On-Demand Separation of Oil-Water Mixtures. Advanced Materials. vol. 24. Issue 27. pp. 3666-3671 (2012).

Mabry, Joseph M., et al., "Fluorinated Polyhedral Oligomeric Silsesquioxanes (F-POSS)," Angewandte Chemie Int. Ed., vol. 47, pp. 4137-4140 (2008) (available online Apr. 24, 2008).

Sigma-Alrdrich Fine Chemicals. Silsesquioxanes Bridging the Gap between Polymers & Ceramics. ChemFiles. vol. 1. No. 6. pp. 1-14 (2001).

The International Written Opinion of the International Searching Authority dated Mar. 5, 2015 for PCT International Application No. PCT/US2014/059727.

The International Search Report and Written Opinion of the International Searching Authority dated Dec. 2, 2013 for PCT International Application No. PCT/US2013/041604 (Pub. No. WO 2013/73722).

Tuteja, Anish, et al., "Designing Superoleophobic Surfaces," Science, vol. 318, pp. 1618-1622 (Dec. 7, 2007).

Non-Final Office Action regarding U.S. Appl. No. 14/732,652, dated Sep. 7, 2016.

(56) References Cited

OTHER PUBLICATIONS

Non-Final Office Action regarding U.S. Appl. No. 13/734,446, dated Jun. 10, 2016.
Non-Final Office Action regarding U.S. Appl. No. 12/599,465, dated Aug. 19, 2016.
Non-Final Office Action regarding U.S. Appl. No. 12/599,465, dated Sep. 11, 2012.
Final Office Action regarding U.S. Appl. No. 12/599,465, dated Jan. 16, 2013.
Non-Final Office Action regarding U.S. Appl. No. 12/599,465, dated May 15, 2014.
Final Office Action regarding U.S. Appl. No. 12/599,465, dated Oct. 16, 2014.
Non-Final Office Action regarding U.S. Appl. No. 12/599,465, dated Sep. 16, 2015.
Final Office Action regarding U.S. Appl. No. 12/599,465, dated Jan. 29, 2016.
Non-Final Office Action regarding U.S. Appl. No. 13/734,446, dated May 1, 2015.
Final Office Action regarding U.S. Appl. No. 13/734,446, dated Nov. 23, 2015.
Tuteja, Anish, et al., "Design Parameters for Superhydrophobicity and Superoleophobicity." MRS Bulletin, vol. 33, pp. 752-758 (Aug. 2008).
Tuteja, Anish, et al., "Robust Omniphobic Surfaces." PNAS, vol. 105. No. 14, pp. 18200-18205 (Nov. 25, 2008).
Choi, Wonjae, et al., "Fabrics with Tunable Oleophobicity." Advanced Materials, vol. 21., pp. 1-6. (2009).
Chhatre, Shreerang S., et al., "Scale Dependence of Omniphobic Mesh Surfaces," Langmuir Article, vol. 26, No. 6, pp. 4027-4035 (2010).
Young, Thomas, "An Essay to the Cohesion of Fluids," Philosophical Transactions of the Royal Society of London, vol. 95, pp. 65-87. (1805).
Shirtcliffe, Neil J. et al., "Porous Materials show Superhydrophobic to Superhydrophilic Switching," Chemical Communication, pp. 3135-3137. (2005).
Choi, Wonjae et al., "A Modified Cassie-Baxter Relationship to Explain Contact Angle Hysteresis and Anisotrophy on Non-wetting Textured Surfaces," Journal of Colloid and Interface Science, vol. 339. pp. 208-216. (2009).
Howarter, John A. et al., "Amphiphile grafted Membranes for the Separation of Oil-in-Water Dispersions," Journal of Colloid and Interface Science, vol. 329. pp. 127-132. (2009).
Final Office Action regarding U.S. Appl. No. 14/013,600, dated Feb. 4, 2016.
Extended European Search Report issued in corresponding European application No. 14851492.0.
The International Search Report and Written Opinion of the International Searching Authority dated Feb. 28, 2012 for PCT International Application No. PCT/US2011/40353 (Pub. No. WO 2011/15699).
Nishi, K. et al. "Potential of Rapeseed Oil as Diesel Engine Fuel," SAE Technical Paper. (2004) (Abstract Only).
Non-Final Office Action issued in cross-referenced U.S. Appl. No. 12/599,465, dated Dec. 12, 2017.
The Official Filing Receipt, Claims, and Drawings of cross-referenced U.S. Appl. No. 15/870,524, filed Jan. 12, 2018, entitled "Apparatuses and Methods for Energy Efficient Separations Including Refining of Fuel Products."
Owen, Michael J., and Hideki Kobayashi. "Surface active fluorosilicone polymers." Macromolecular Symposia. vol. 82. No. 1. HÜthig & Wepf Verlag, 1994.
Canadian Office Action dated Feb. 22, 2018 in corresponding Canadian Application No. 2,802,859.

\* cited by examiner

SUPERHYDROPHILIC AND OLEOPHOBIC POROUS MATERIALS AND METHODS FOR MAKING AND USING THE SAME

CROSS-REFERENCE TO RELATED APPLICATIONS

This application is a continuation of U.S. patent application Ser. No. 13/159,950, filed on Jun. 14, 2011 and issued as U.S. Pat. No. 9,186,631 on Nov. 17, 2015, which claims the benefit of U.S. Provisional Application No. 61/354,522, filed on Jun. 14, 2010. The entire disclosures of each of the above applications are incorporated herein by reference.

RIGHTS OF THE GOVERNMENT

The invention described herein may be manufactured and used by or for the Government of the United States for all governmental purposes without the payment of any royalty.

FIELD

The present disclosure relates to liquid-liquid separations, and more specifically to superhydrophilic and oleophobic porous separator materials, as well as methods of making and using the same.

BACKGROUND

This section provides background information related to the present disclosure which is not necessarily prior art.

With increasing environmental awareness and tighter regulations, cost-effective strategies for liquid-liquid separations demonstrating improved efficacy are needed. This is especially true for separation of oil from water (or other aqueous phase components), especially in industrial waste waters and oil spill clean ups, for example. In particular, membrane-based separation technologies are becoming more attractive compared to conventional gravity separators, because of their lower energy costs and applicability across a wide range of industrial effluents. However, there remains a need for improved membrane separator materials that can be used in a vast array of different technological fields and applications for increased, cost-effective, continuous separations processes.

SUMMARY

This section provides a general summary of the disclosure, and is not a comprehensive disclosure of its full scope or all of its features.

In certain aspects, the present disclosure provides a porous material comprising a porous substrate having a surface that has a low surface energy and furthermore is superhydrophilic. In certain aspects, the surface is superhydrophilic because it has a first apparent advancing dynamic contact angle of less than or equal to about 5°. In certain aspects, a first apparent advancing dynamic contact angle of less than or equal to about 5° for water on the surface occurs in the presence of water. In certain aspects, the surface is also considered to be oleophobic because it has a low surface energy and a second apparent advancing dynamic contact angle of greater than or equal to about 90° for a preselected oil, such as rapeseed oil. In alternative aspects, the surface having a low surface energy can be an oleophilic material.

In other aspects, the present disclosure provides a method of making a superhydrophilic and an oleophobic porous material. In certain variations, the method may comprise applying a first material and a second distinct material to a surface of a porous substrate. The first material is capable of hydrogen bonding or electrostatically interacting with a polar or charged moiety. The second distinct material is a low surface energy material, which is optionally oleophobic or oleophilic. In certain, after the first and second materials are applied to the surface of the porous substrate, the surface exhibits both superhydrophilic and oleophobic properties. The surface is superhydrophilic in that it has a first apparent advancing dynamic contact angle of less than or equal to about 1° for water. In certain variations, the surface is considered to be oleophobic in that it has a second apparent advancing dynamic contact angle of greater than or equal to about 90° for a preselected oil, such as rapeseed oil.

In yet other aspects, the present disclosure provides methods of separating components in a liquid-liquid mixture. The liquid-liquid mixture comprises a first component present at an initial amount, as well as a second component. In certain variations, the methods optionally comprise contacting a liquid-liquid mixture with a superhydrophilic and oleophobic surface of a porous separator material. The contacting facilitates passage of the first component through the porous separator material, so that the contacting separates greater than or equal to about 85 weight % of the initial amount of the first component from the liquid-liquid mixture. In certain variations, the contacting separates greater than or equal to about 90 weight % up to 100 weight % of the initial amount of the first component from the liquid-liquid mixture. Further, such methods can be conducted as continuous processes. In certain variations, such processes are gravity-assisted.

In yet other variations, the present disclosure provides a separator device for continuously conducting such separations processes. For example, such an apparatus may have a configuration so that the liquid-liquid mixture is gravity fed towards the superhydrophilic and oleophobic surface of a porous separator material. The first porous separator material is operable to continuously separate the first component from the liquid-liquid mixture. A second additional porous separator may optionally be present and configured in the apparatus to continuously remove the second component from a region above the superhydrophilic and oleophobic surface.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 shows a schematic of an exemplary measurement technique for determining dynamic advancing angle $\theta_{adv}$ and dynamic receding angle $\theta_{rec}$.

Figures 2A, 2B, 2C, 2D:
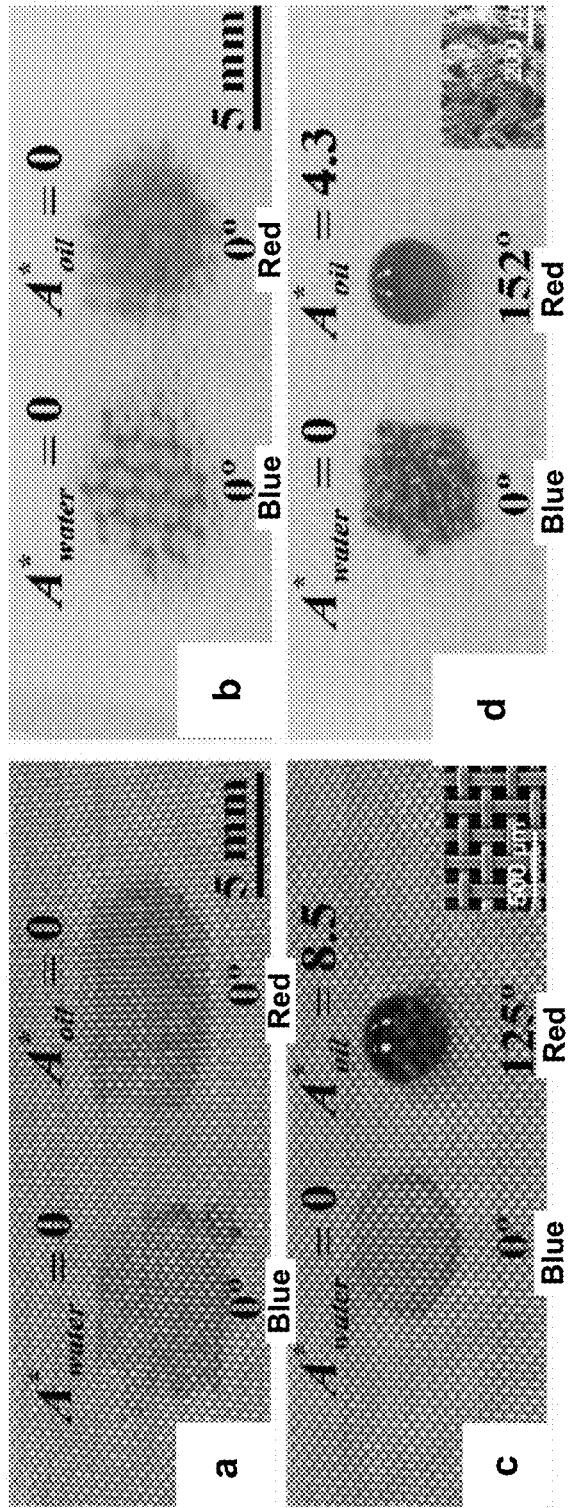

FIGS. 2a-2d show the comparative wetting behavior of water and an exemplary rapeseed oil on a porous material surface prepared in accordance with the present teachings and a comparative porous material surface. More specifically, FIGS. 2a and 2b show the wetting behavior of water (blue) and rapeseed oil (red) on a stainless steel mesh porous substrate and a polyester cloth substrate, each dip-coated with neat polyethylene glycol diacrylate (x-PEGDA) forming comparative control samples. FIGS. 2c and 2d show the wetting behavior of water (red) and rapeseed oil (blue) on a stainless steel mesh porous substrate and a polyester cloth substrate prepared in accordance with certain aspects of the principles of the present disclosure, thus dip-coated in a x-PEGDA and 20 weight % 1H,1H,2H,2H-heptadecafluorodecyl polyhedral oligomeric silsequioxane (Fluoro-POSS or F-POSS).

Figures 3A, 3B, 3C:
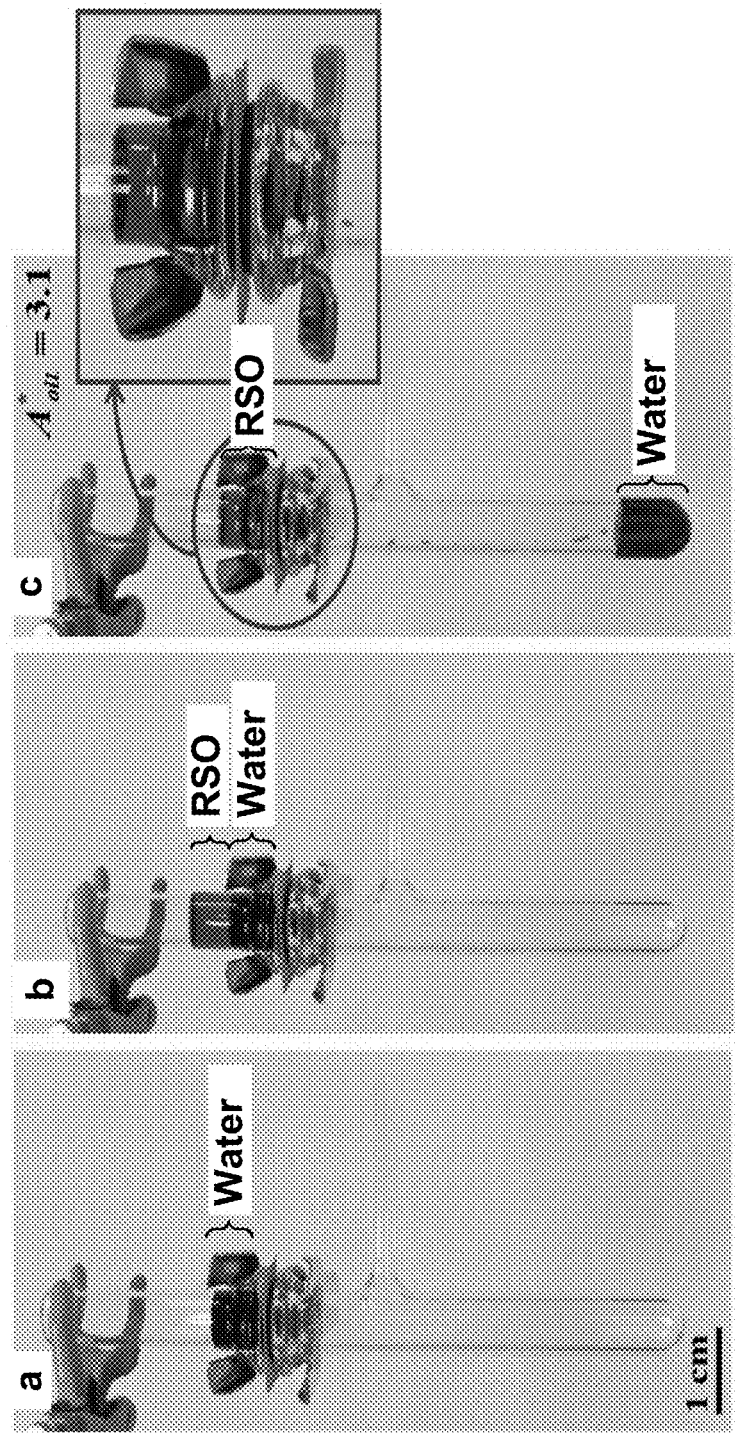

FIGS. 3a-3c show a simple oil-water separation apparatus that includes an exemplary porous material prepared in accordance with certain aspects of the principles of the present disclosure having a stainless steel porous mesh coated with x-PEGDA and 20 weight % F-POSS sandwiched as a separator membrane between two vertical glass tubes, where separation is conducted on a water-oil liquid-liquid mixture. FIG. 3a shows time at 0; FIG. 3b shows an elapsed time of 30 seconds; and FIG. 3c shows an elapsed time of 60 seconds.

Figures 4A, 4B, 4C, 4D:
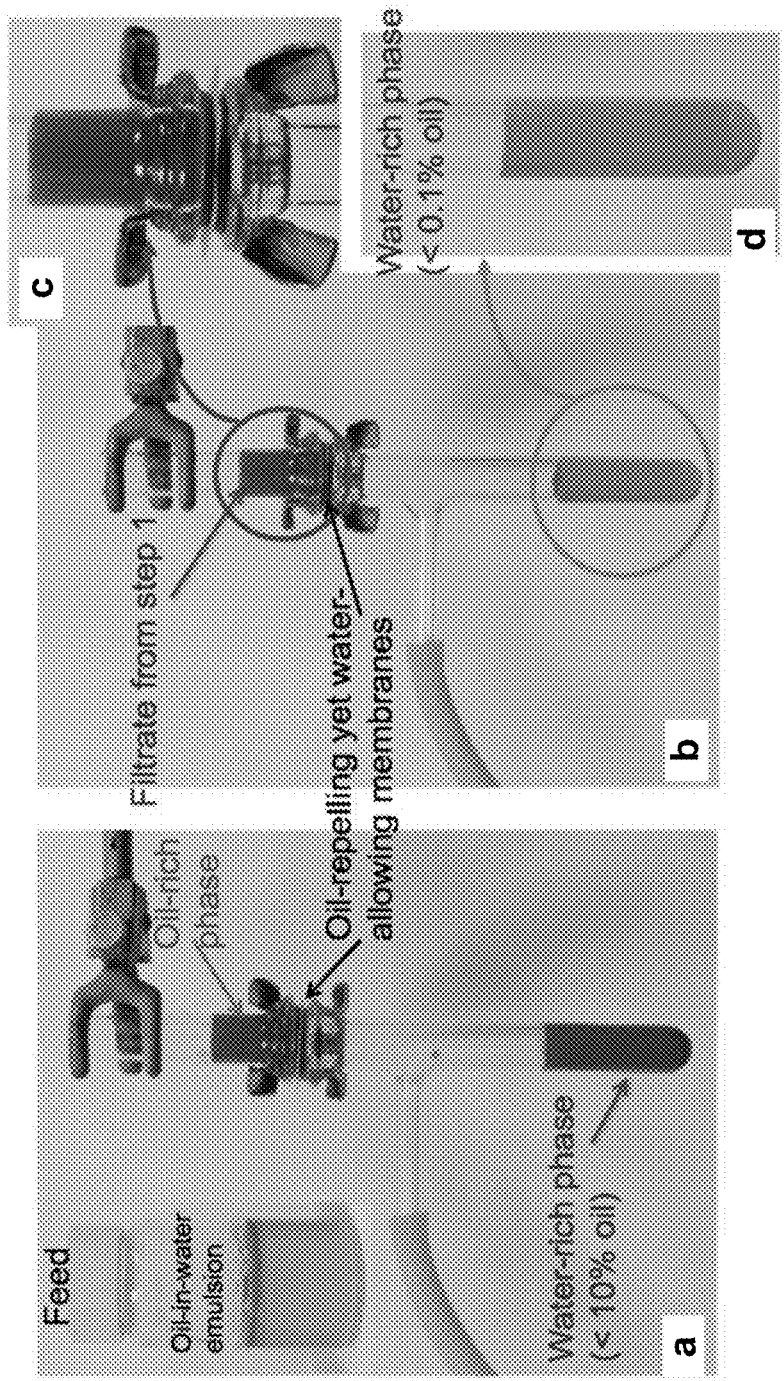

FIGS. 4a-4d show another similar oil-water separation apparatus as shown in FIGS. 3a-3c, including an exemplary porous material prepared in accordance with the principles of the present disclosure sandwiched as a separator membrane between two vertical glass tubes, where separation is conducted in several distinct filtration steps on a water-oil emulsion. FIG. 4a shows a first filtration step, while FIG. 4b shows a second filtration step (with the filtrate from the first step). FIG. 4c is a detailed view of the filtered oil phase from FIG. 4b, while FIG. 4d is a detailed view of the water-rich filtered phase having less than 0.1% oil present.

Figures 5A, 5B, 5C, 5D:
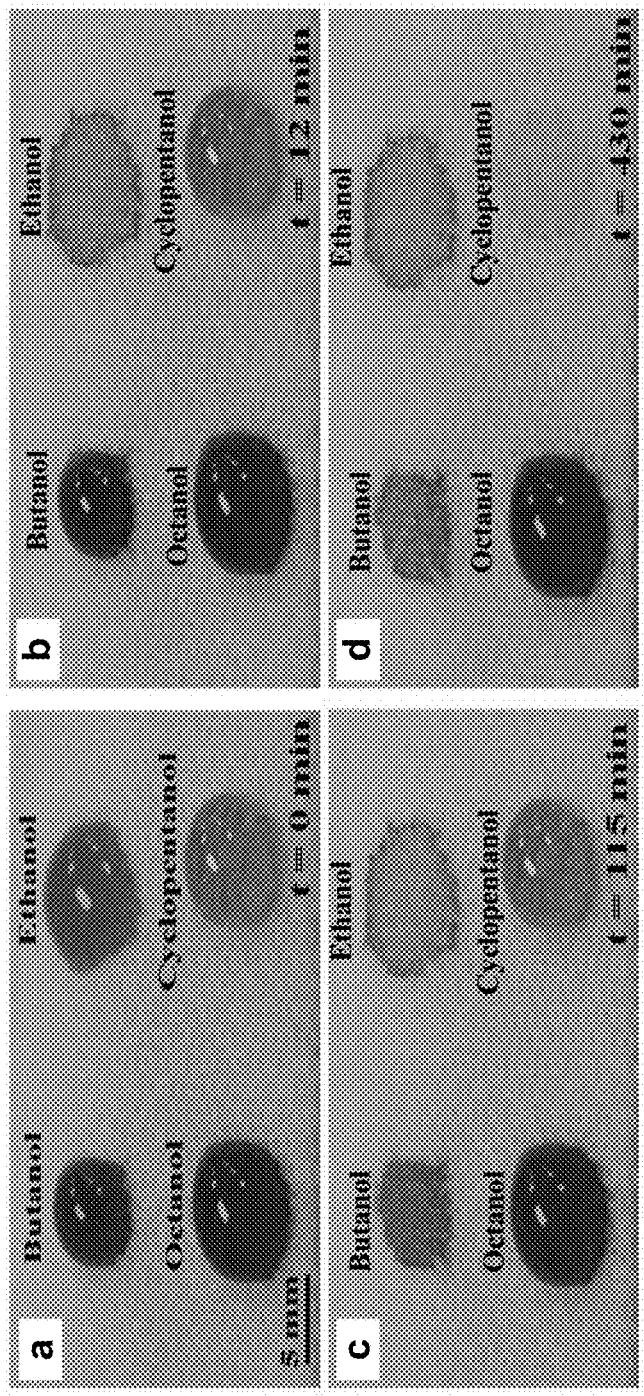

FIGS. 5a-5d shows comparative wetting of ethanol (dielectric constant $\mu=24.3$, surface tension $\gamma_{lv}=21.9$ mN/m, time of wetting (ToW)=12 min), butanol ($\mu=17.8$, $\gamma_{lv}=24.9$ mN/m, ToW=115 min), cyclopentanol ($\mu=17.1$, $\gamma_{lv}=32.1$ mN/m, ToW=430 min) and octanol ($\mu=10.3$, $\gamma_{lv}=27.1$ mN/m, ToW>24 h) on a polyester substrate prepared in accordance with certain principles of the present disclosure. FIG. 5a shows a time at 0; FIG. 5b shows an elapsed time at 12 minutes (showing ethanol has penetrated the membrane); FIG. 5c shows an elapsed time of 115 minutes (showing both ethanol and butanol have penetrated the membrane); and FIG. 5d shows an elapsed time of 430 minutes (showing ethanol, butanol, and cyclopentanol have penetrated the membrane, while octanol remains intact on the membrane surface).

Figures 6A, 6B, 6C, 6D, 6E, 6F, 6G:
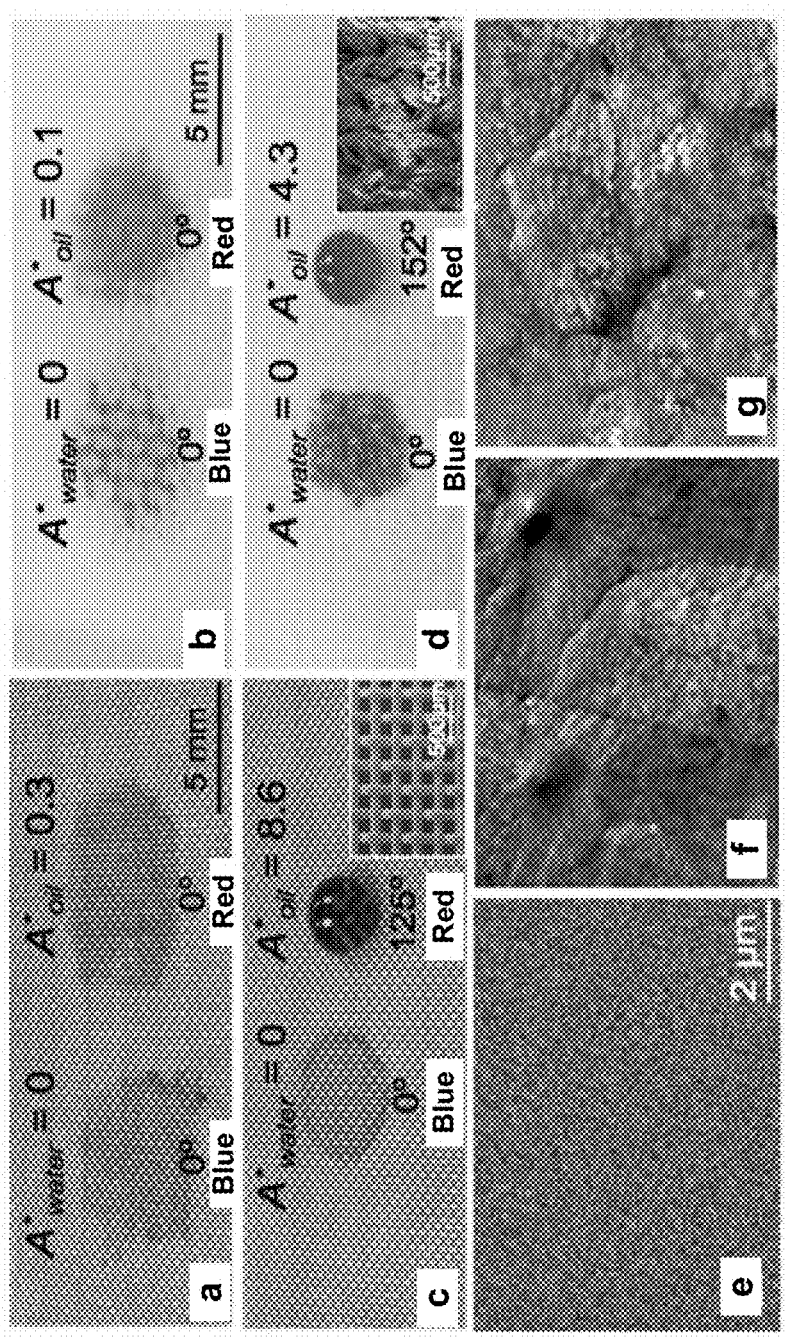

FIGS. 6a-6g. FIGS. 6a-6b show x-PEGDA dip-coated stainless steel mesh 100 and polyester fabric surfaces, respectively. Both water (blue) and rapeseed oil (red) readily permeate through these high surface energy membranes. FIGS. 6c-6d show droplets of water and rapeseed oil on stainless steel mesh 100 and polyester fabric surfaces, respectively. Both surfaces have been dip-coated with a blend of 20 weight % fluorodecyl POSS and a balance x-PEGDA in accordance with certain aspects of the principles of the present disclosure. The insets in FIGS. 6c-6d illustrate the morphology of the dip-coated mesh and fabric surfaces, respectively. FIGS. 6e-6g show atomic force microscopy (AFM) phase images of surfaces formed from neat x-PEGDA (FIG. 6e), and blends of x-PEGDA at 10 weight % fluorodecyl POSS and the balance x-PEGDA and cross-linker (FIG. 6f), and a blend of 20 weight % fluorodecyl POSS and the balance x-PEGDA and cross-linker (FIG. 6g). The phase angle scale for the images FIGS. 6e, 6f, and 6g ranges from 0°-115°, 0°-25°, and 0°-21°, respectively. While crystalline domains are absent on the neat x-PEGDA surface (FIG. 6e), the surfaces of both 10 weight % and 20 weight % fluorodecyl POSS (FIGS. 6f and 6g) blends are completely covered with crystalline domains of fluorodecyl POSS, indicating significant surface segregation of the fluorodecyl POSS molecules (which is expected due to their extremely low surface energy).

Figures 7A, 7B, 7C, 7D, 7E, 7F:
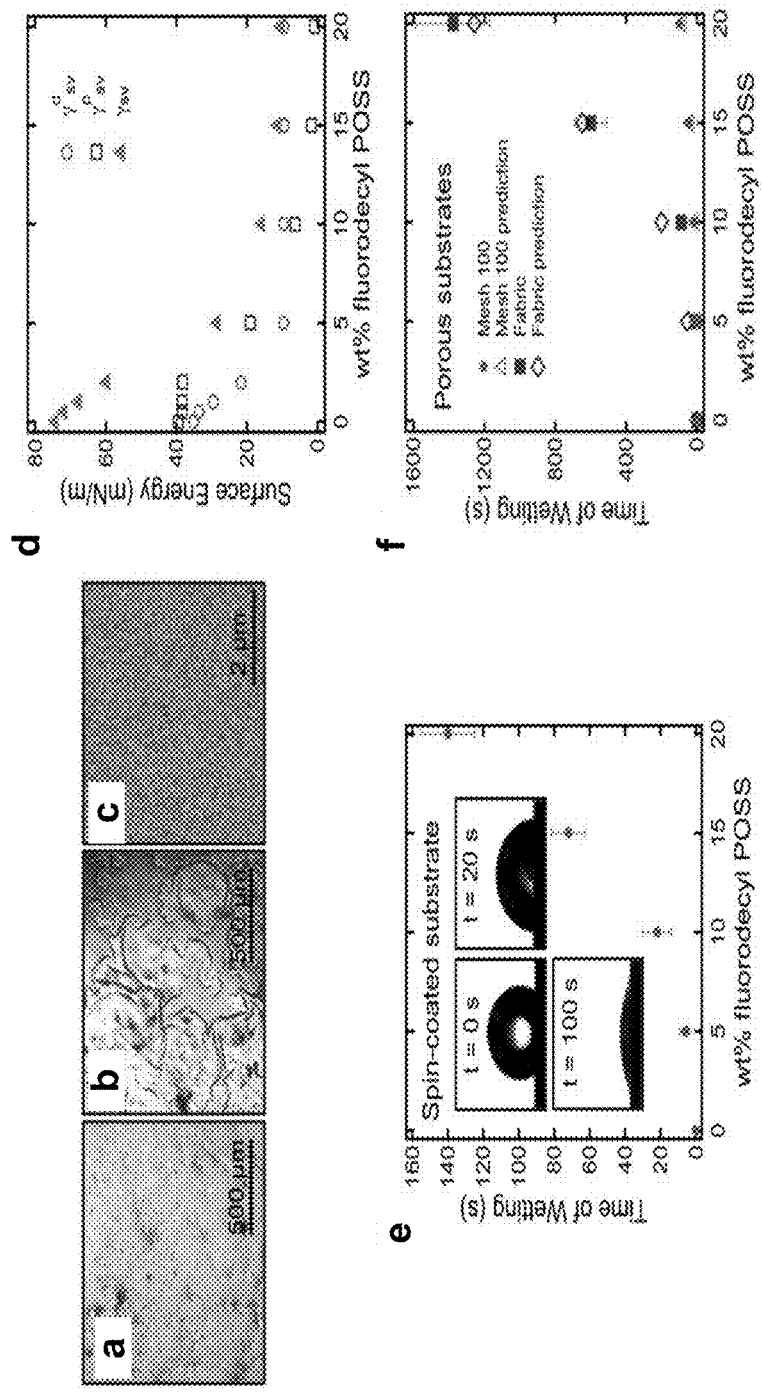

FIGS. 7a-7f. FIGS. 7a-7b are optical microscopy images of a surface prepared in accordance with certain aspects of the principles of the present disclosure having a blend of 20 weight % fluorodecyl POSS and a balance x-PEGDA in air and under water, respectively. FIG. 7c shows such a surface in-situ, under water, AFM phase image of 20 weight % fluorodecyl POSS and x-PEGDA blend surface. The phase angle scale for this image ranges from 0°-112°. FIG. 7d shows the polar ($\gamma_{sv}^p$), dispersive ($\gamma_{sv}^d$) and total surface energy ($\gamma_{sv}$) values for certain fluorodecyl POSS and x-PEGDA blends prepared in accordance with certain aspects of the principles of the present disclosure. FIGS. 7e and 7f show time of wetting (ToW) of water on fluorodecyl POSS and x-PEGDA blends for different spin-coated and porous substrates, respectively. The insets in FIG. 7e show the time-dependant decrease in contact angle for a water droplet on a 20 weight % fluorodecyl POSS and x-PEGDA surface, due to surface reconfiguration. The time of wetting predictions on the mesh 100 and the fabric membranes match closely with experimental measurements, as shown in FIG. 7f.

Figure 8:
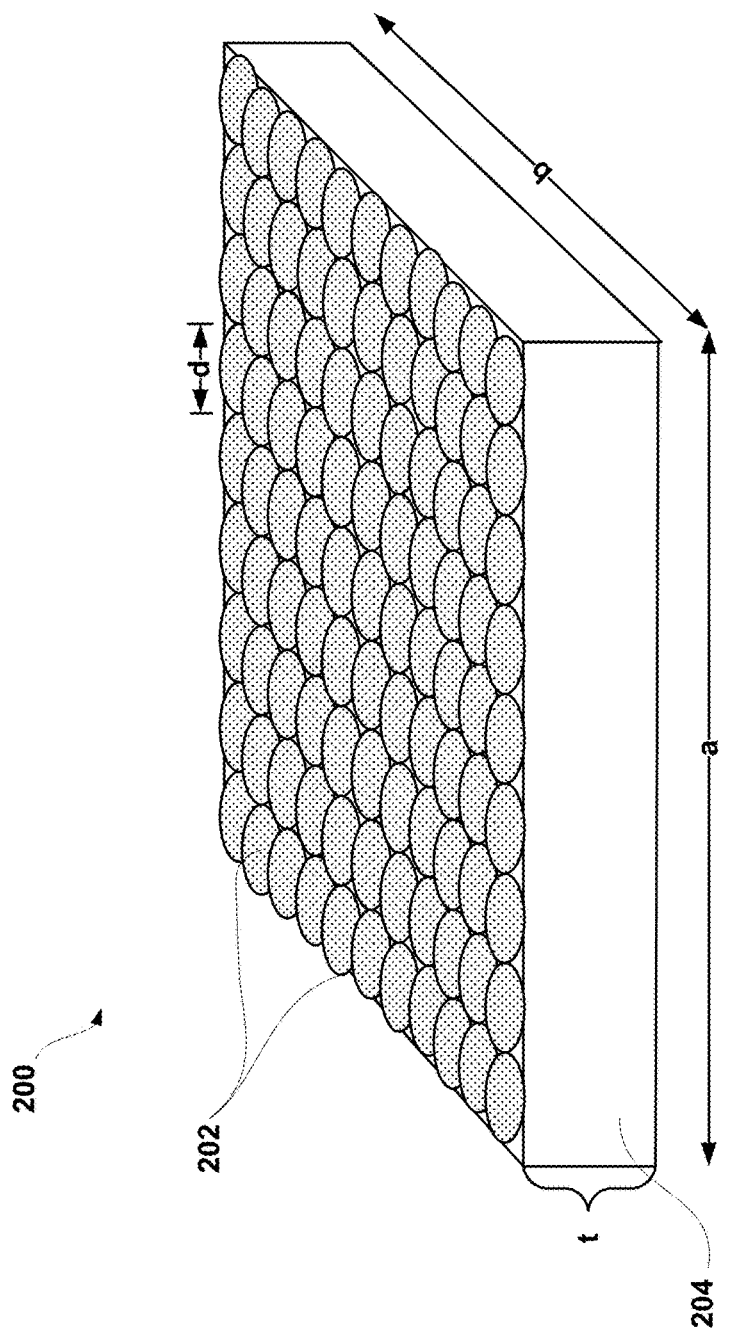

FIG. 8 is a schematic of a film of fluorodecyl POSS and x-PEGDA blend preparing in accordance with certain aspects of the present teachings.

Figures 9A, 9B:
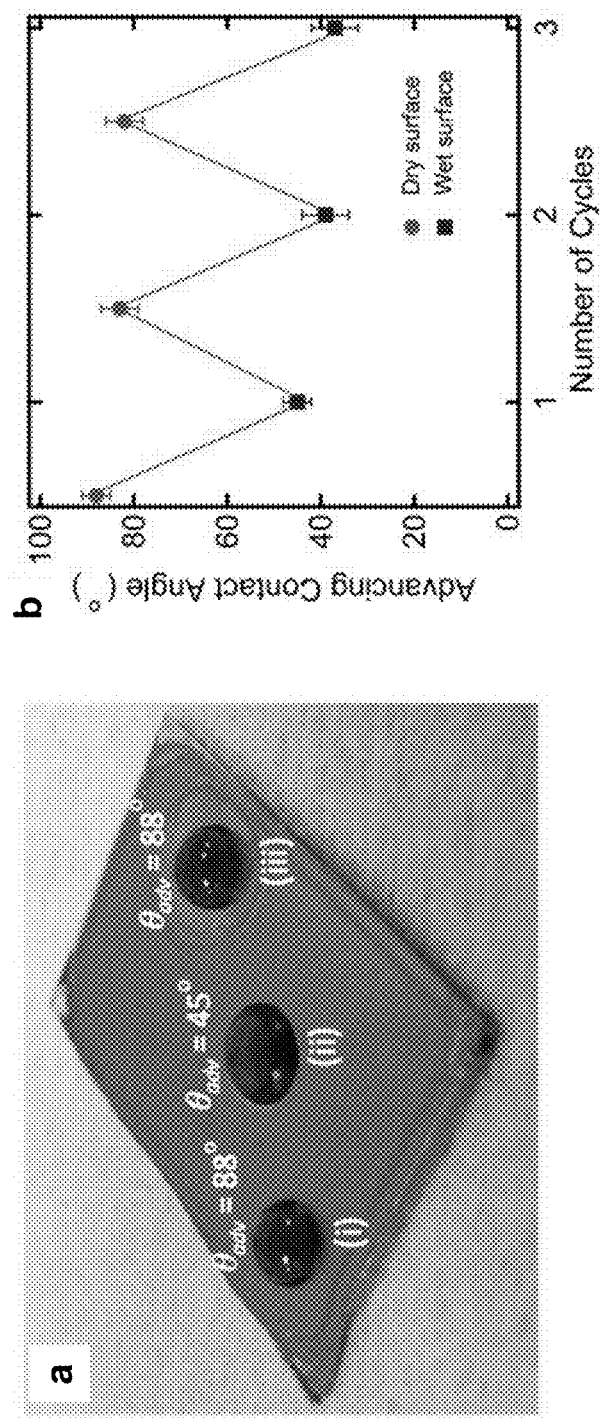

FIGS. 9a-9b. 9a shows images of rapeseed oil (red) at three different locations on a substrate spin-coated with a 20 weight % fluorodecyl POSS and x-PEGDA blend in accordance with certain aspects of the principles of the present disclosure. Location (i) is at an as-prepared and dry location, (ii) is at a location previously wet by water, and (iii) is at a location that was wet previously by water and subsequently dried completely. FIG. 9b shows a contact angle of rapeseed oil at a fixed location as a function of water wetting-drying cycles.

Figures 10A, 10B:
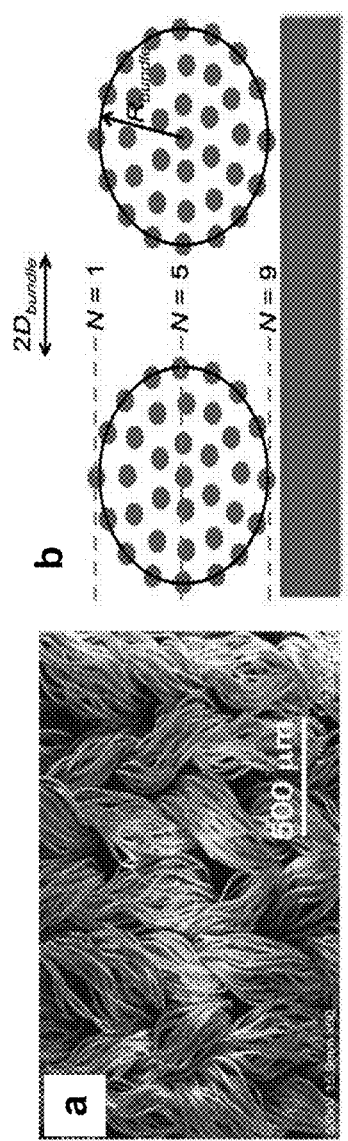

FIGS. 10a-10b. FIG. 10a is a scanning electron microscopy (SEM) image of the dip-coated fabric with interwoven bundles. Each bundle contains several layers of smaller individual fibers. FIG. 10b is a schematic illustrating the two scales of texture (bundles and individual fibers) for the fabric for certain variations of porous substrates used in the present teachings.

Figure 11:
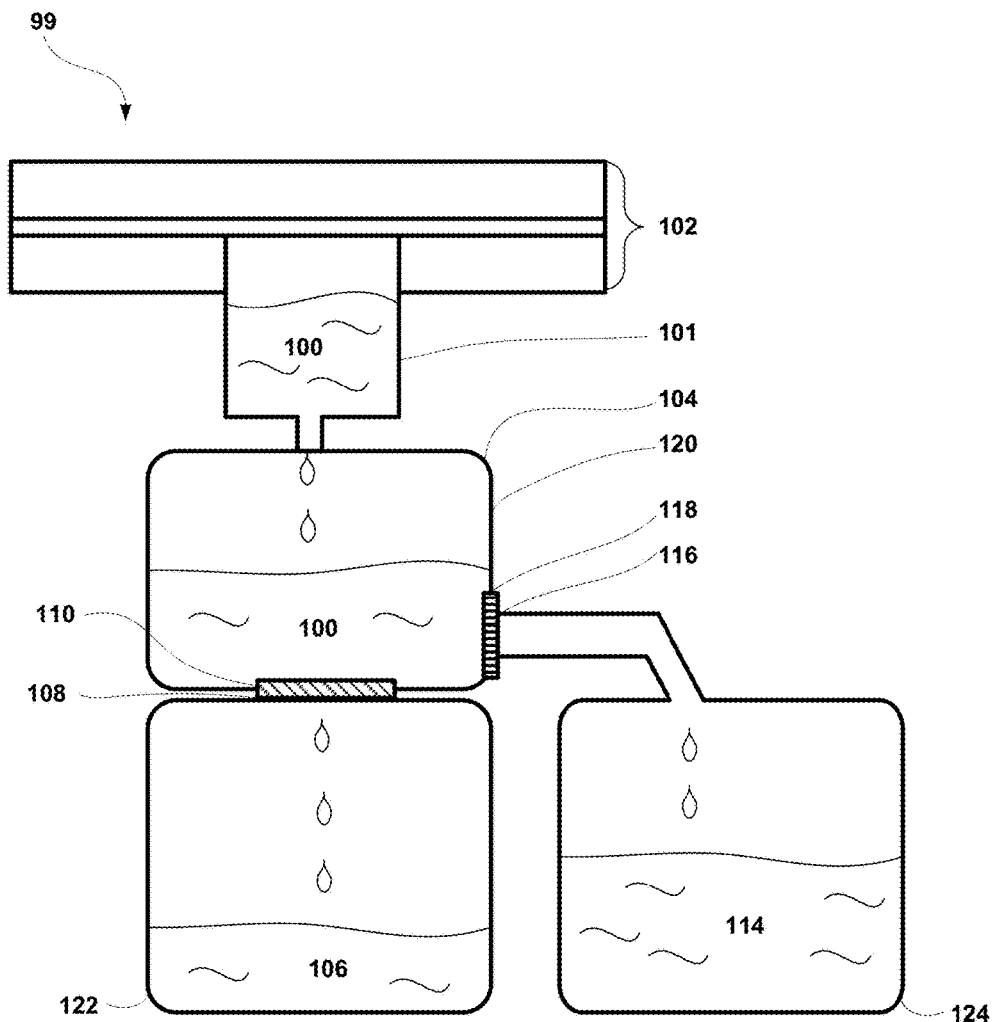

FIG. 11 shows a schematic illustration of one embodiment of the present teachings showing an exemplary gravity-assisted capillary force driven separation (CFDS) apparatus used for the continuous separation of an emulsion, for example a water-in-hexadecane emulsion. The emulsion is fed into a feeding chamber (e.g., a glass tube) at a constant rate by using a syringe pump. Water-rich permeate passes through a hydrophilic and oleophobic membrane along a bottom of the feeding chamber, while hexadecane-rich permeate passes through a hydrophobic and oleophilic membrane disposed in a sidewall of the feeding chamber. An image of an exemplary bench-scale apparatus having a similar configuration is shown in FIG. 13a.

Figures 12A, 12B, 12C, 12D, 12E:
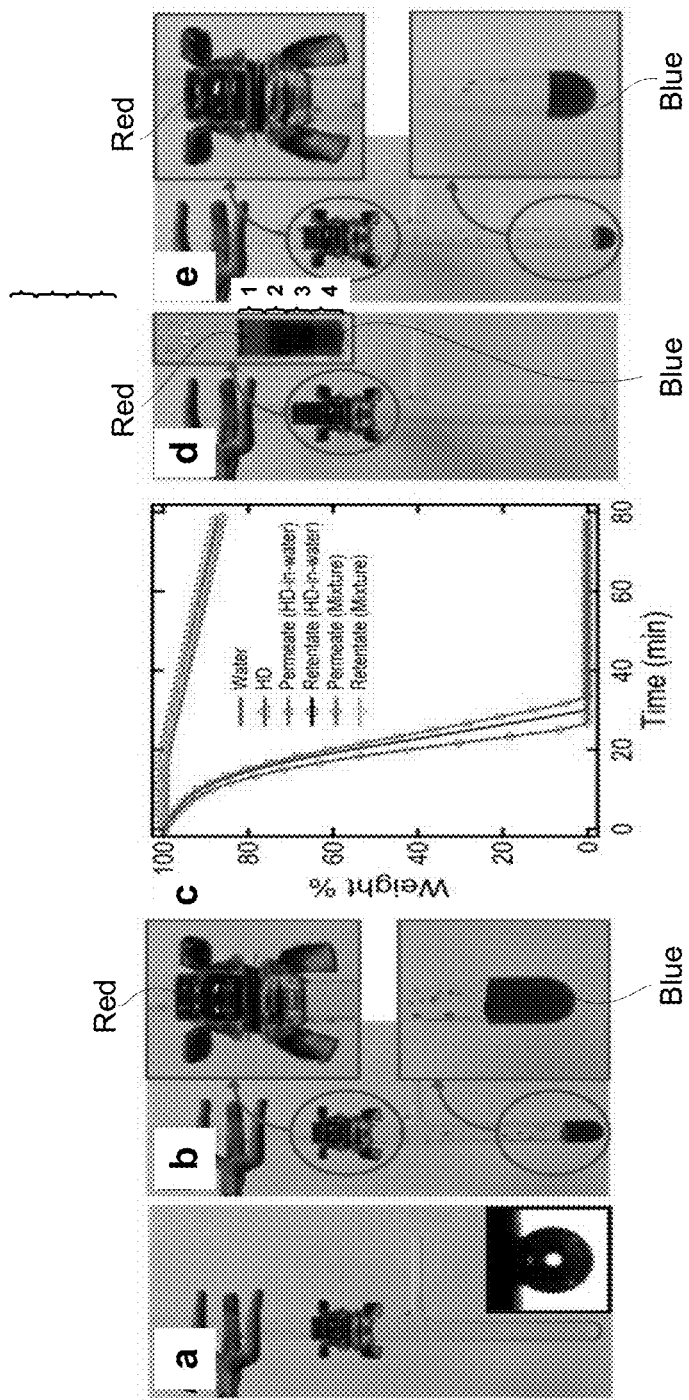

FIGS. 12a-12e. FIG. 12a shows a bench-scale gravity-assisted capillary force driven separation (CFDS) apparatus having an emulsion (a hexadecane-in-water emulsion) in an upper tube above a hydrophilic and oleophobic membrane prepared in accordance with certain aspects of the principles of the present disclosure. The inset shows a contact angle of hexadecane on a surface spin-coated with 20 weight % fluorodecyl POSS and x-PEGDA blend, submerged in water containing dissolved SDS (1 mg/mL). The contact angle is measured to be 120°. FIG. 12b shows after membrane surface reconfiguration, water-rich permeate passes through the membrane while hexadecane-rich retentate is retained above the membrane. FIG. 12c is a thermogravimetric analysis of permeate and retentate from separation of hexadecane-in-water emulsion and the four component mixture. The data for pure water and as-obtained hexadecane (HD) are also shown for comparison. FIG. 12d shows the four component mixture in the upper tube of the separation apparatus, above the membrane. The inset shows a larger quantity of the feed in a glass vial to clearly depict the presence of different phases (water (4), hexadecane (1), hexadecane-in-water emulsion (3), and water-in-hexadecane emulsion (2)). FIG. 12e. After membrane surface reconfiguration, water-rich permeate passes through the membrane while hexadecane-rich retentate is retained above the membrane. In FIGS. 12a, 12b, 12d, and 12e, water is blue and hexadecane is red.

Figures 13A, 13B, 13C:
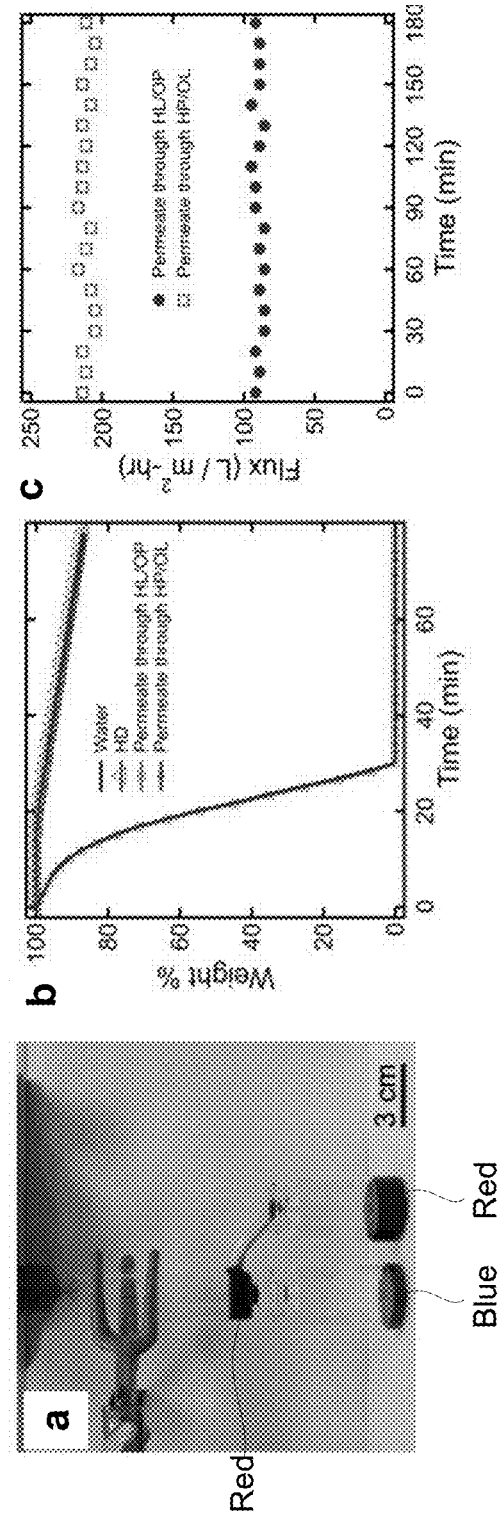

FIGS. 13a-13c. FIG. 13a is an image of yet another embodiment of a bench-scale gravity-assisted capillary force driven separation (CFDS) apparatus used for continuous separation of an emulsion (e.g., a water-in-hexadecane emulsion) in accordance with certain teachings of the present disclosure. The emulsion is fed at a constant flux using a syringe pump. During continuous separation, water-rich permeate continuously passes through a hydrophilic and oleophobic membrane disposed along a bottom of a feeding chamber, while hexadecane-rich permeate continuously passes through a hydrophobic and oleophilic membrane disposed in a sidewall of the feeding chamber. Water is dyed blue and hexadecane is dyed red. FIG. 13b shows thermogravimetric analyses of the permeates from the hydrophilic and oleophobic (HL/OP) membrane and the hydrophobic and oleophilic (HP/OL) membrane. The data for pure water and as-obtained hexadecane (HD) are also shown for comparison. FIG. 13c shows measured fluxes for both permeates as a function of time.

Figures 14A, 14B:
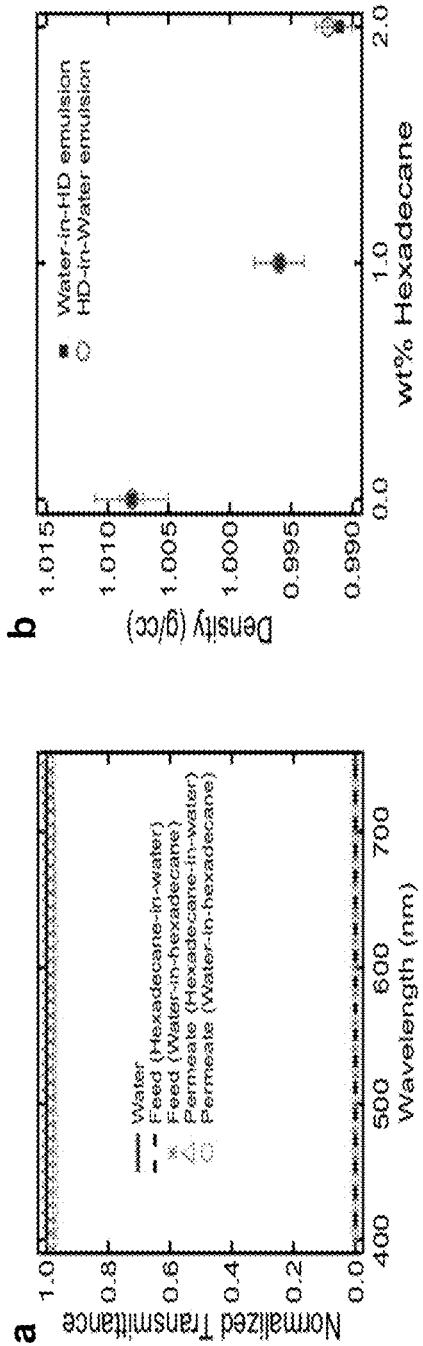

FIGS. 14a-14b. FIG. 14a shows the transmittance of hexadecane-in-water and water-in-hexadecane feed emulsions as a function of wavelength for all wavelengths between 390-750 nm (visible spectrum). The data shown is obtained by normalizing the absorbance of the hexadecane-in-water emulsion to 1. The transmittance of the corresponding permeates is also shown. FIG. 14b is the density of hexadecane-in-water and water-in-hexadecane emulsions as a function of hexadecane (HD) composition.

Figures 15A, 15B, 15C:
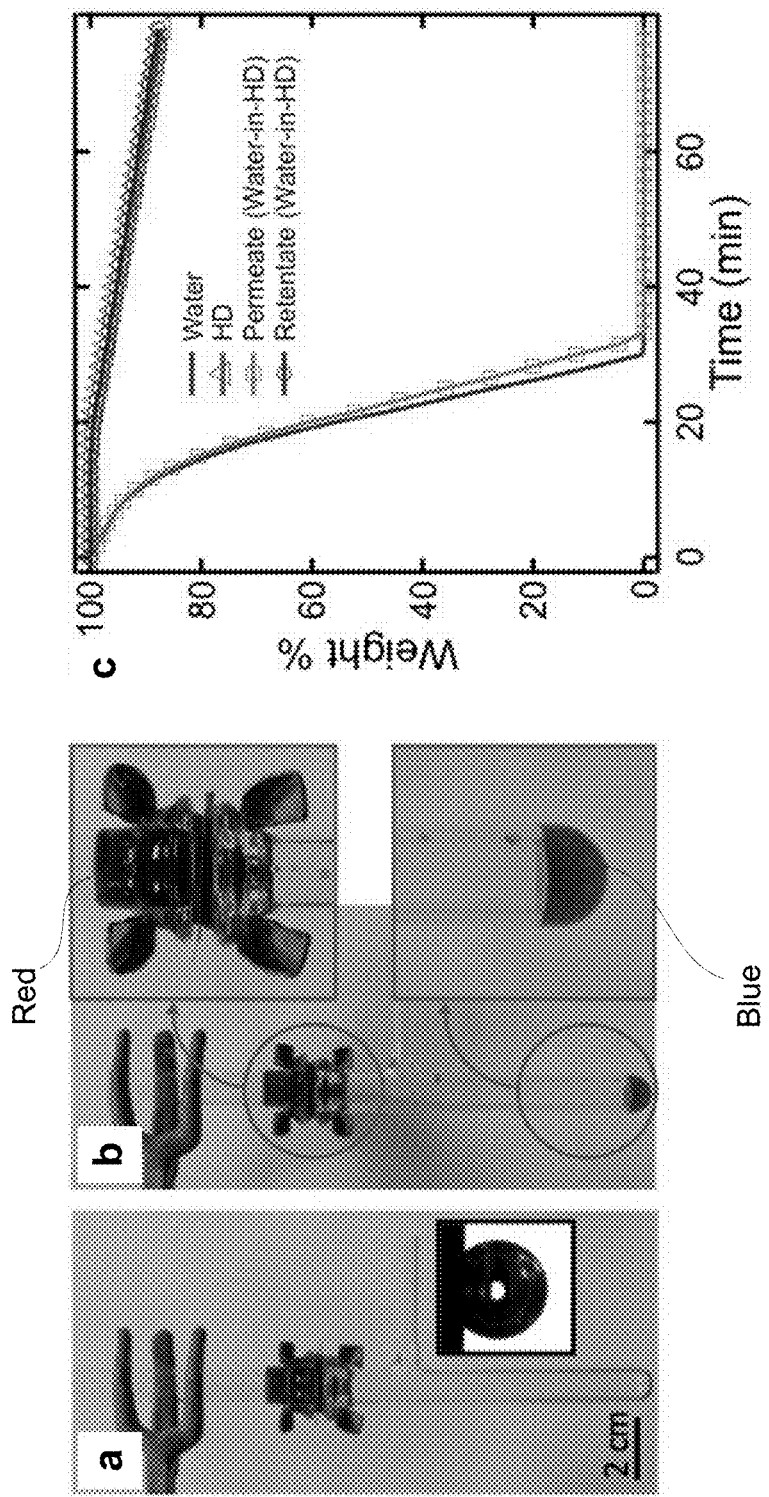

FIGS. 15a-15c. FIG. 15a is an image of yet another embodiment of a bench-scale gravity-assisted capillary flow driven separation (CFDS) apparatus prepared in accordance with certain embodiments of the present disclosure processing a water-in-hexadecane emulsion. The inset shows a contact angle of hexadecane on a surface spin-coated with a 20 weight % fluorodecyl POSS and x-PEGDA blend, submerged in water containing dissolved PS80 (1 mg/mL). The contact angle θ is measured to be 125°. FIG. 15b shows after membrane surface reconfiguration, water-rich permeate passes through the membrane, while hexadecane-rich retentate is retained above the membrane. FIG. 15c shows thermogravimetric analyses of the permeate and the retentate. The data for pure water and as-obtained hexadecane (HD) are also shown for comparison. In FIGS. 15a and 15b, water is dyed blue and hexadecane is dyed red.

Figures 16A, 16B, 16C:
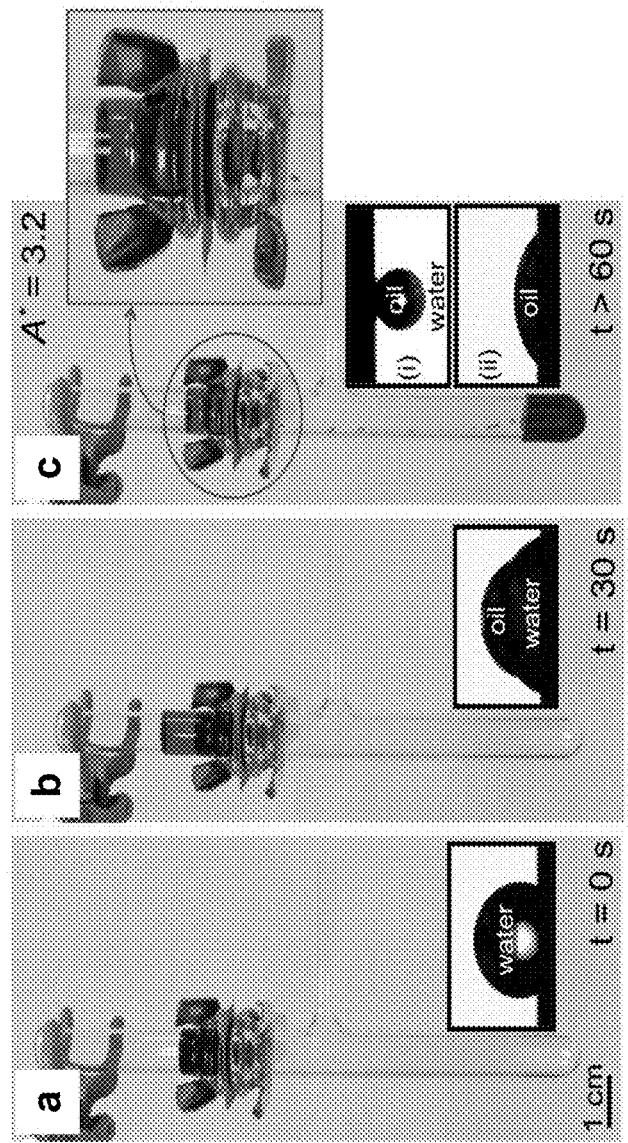

FIGS. 16a-16c show another embodiment of a bench-scale gravity-assisted capillary flow driven separation (CFDS) apparatus for free oil-water separation that includes a separator comprising a mesh 100 (2D=138 μm) coated with a 20 weight % fluorodecyl POSS and x-PEGDA blend sandwiched between two vertical glass tubes. FIG. 16a shows water (blue) was added to the upper tube. The inset shows a drop of water placed on a spin-coated surface of 20 weight % fluorodecyl POSS and x-PEGDA. FIG. 16b shows rapeseed oil (red) added above water. The inset shows a drop of rapeseed oil on top of the drop of water. FIG. 16c shows that water permeates through while rapeseed oil is retained above the membrane. The inset (i) shows the underwater superoleophobicity of rapeseed oil when in contact with mesh 100 dip-coated with 20 weight % fluorodecyl POSS and x-PEGDA. The inset (ii) shows a drop of rapeseed oil on the corresponding spin-coated surface previously wet by water.

Figures 17A, 17B, 17C, 17D, 17E, 17F:
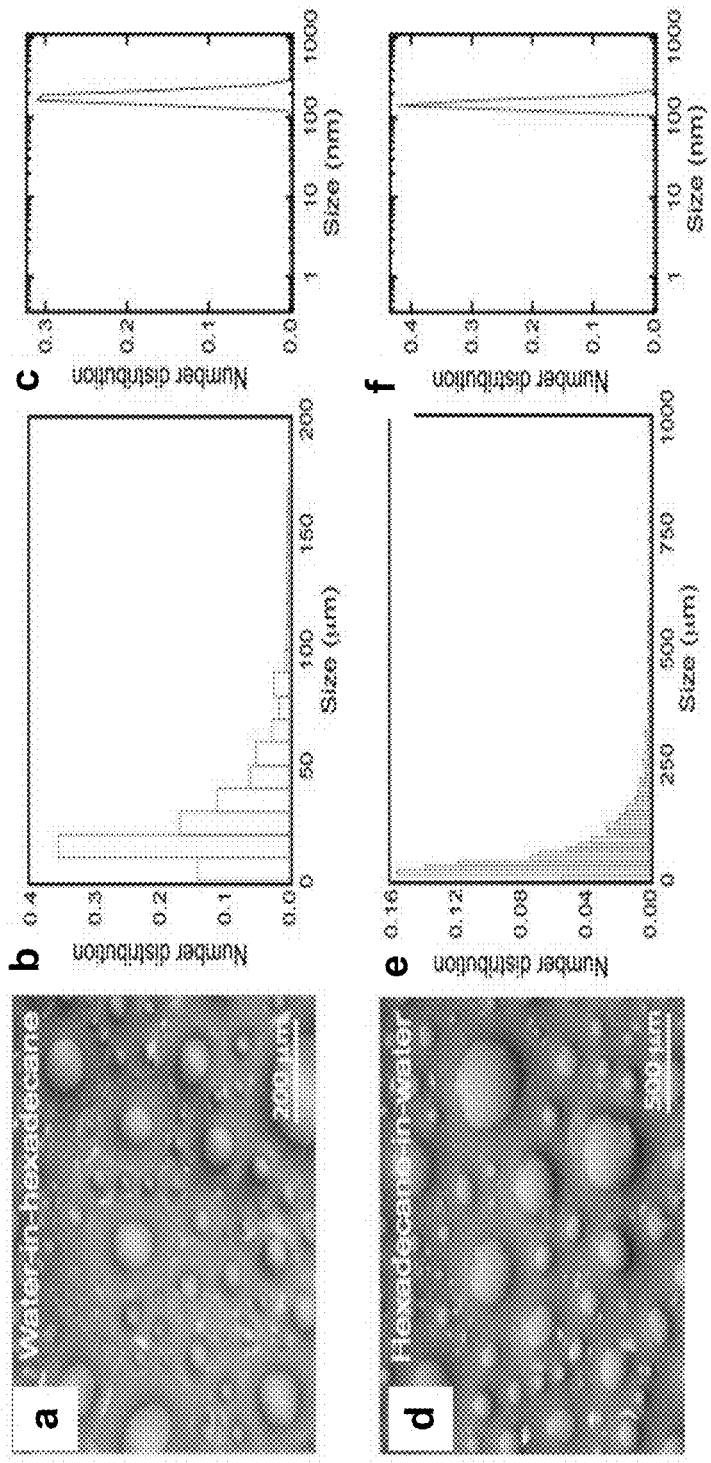

FIGS. 17a-17f. FIG. 17a is a representative optical microscopy image of the water-in-hexadecane feed emulsion. FIGS. 17b and 17c show number size distributions for the water-in-hexadecane feed emulsion obtained using optical image analysis (for droplets>1 μm) and DLS (for droplets<1 μm), respectively. FIG. 17d is a representative optical microscopy image of the hexadecane-in-water feed emulsion. FIGS. 17e and 17f show the number size distributions for the hexadecane-in-water feed emulsion obtained using image analysis (for droplets>1 μm) and DLS (for droplets<1 μm), respectively.

Figures 18A, 18B, 18C, 18D:
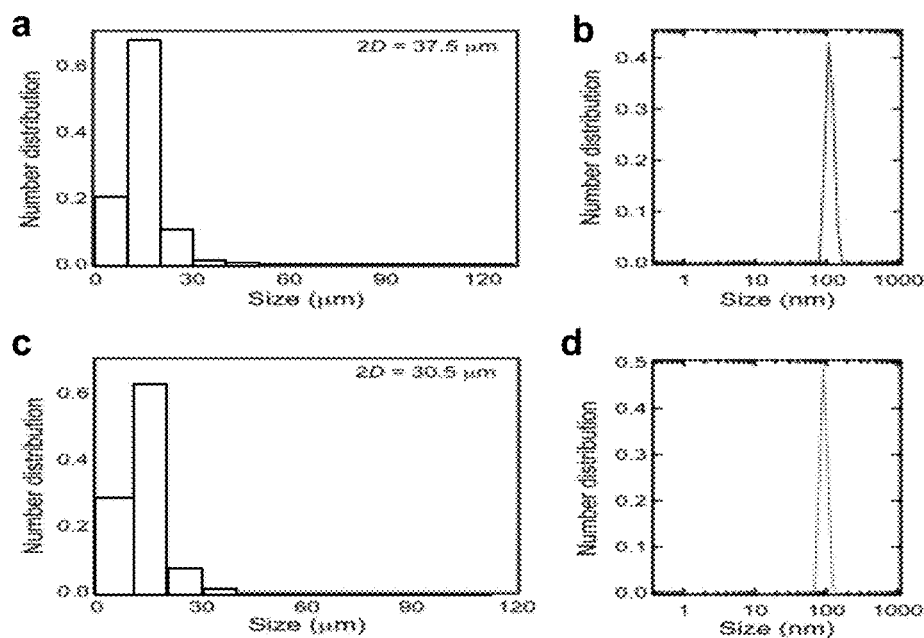

FIGS. 18a-18d. FIGS. 18a and 18b show the number size distributions of a permeate obtained from separation of hexadecane-in-water emulsion prepared in accordance with certain aspects of the principles of the present disclosure where a separator membrane comprises a mesh 400, obtained through optical image analysis and DLS, respectively. FIGS. 18c and 18d show number size distributions of permeate from separation of hexadecane-in-water emulsion prepared in accordance with certain aspects of the principles of the present disclosure, where a separator membrane comprises a mesh 500, obtained through optical image analysis and DLS, respectively.

Figure 19:
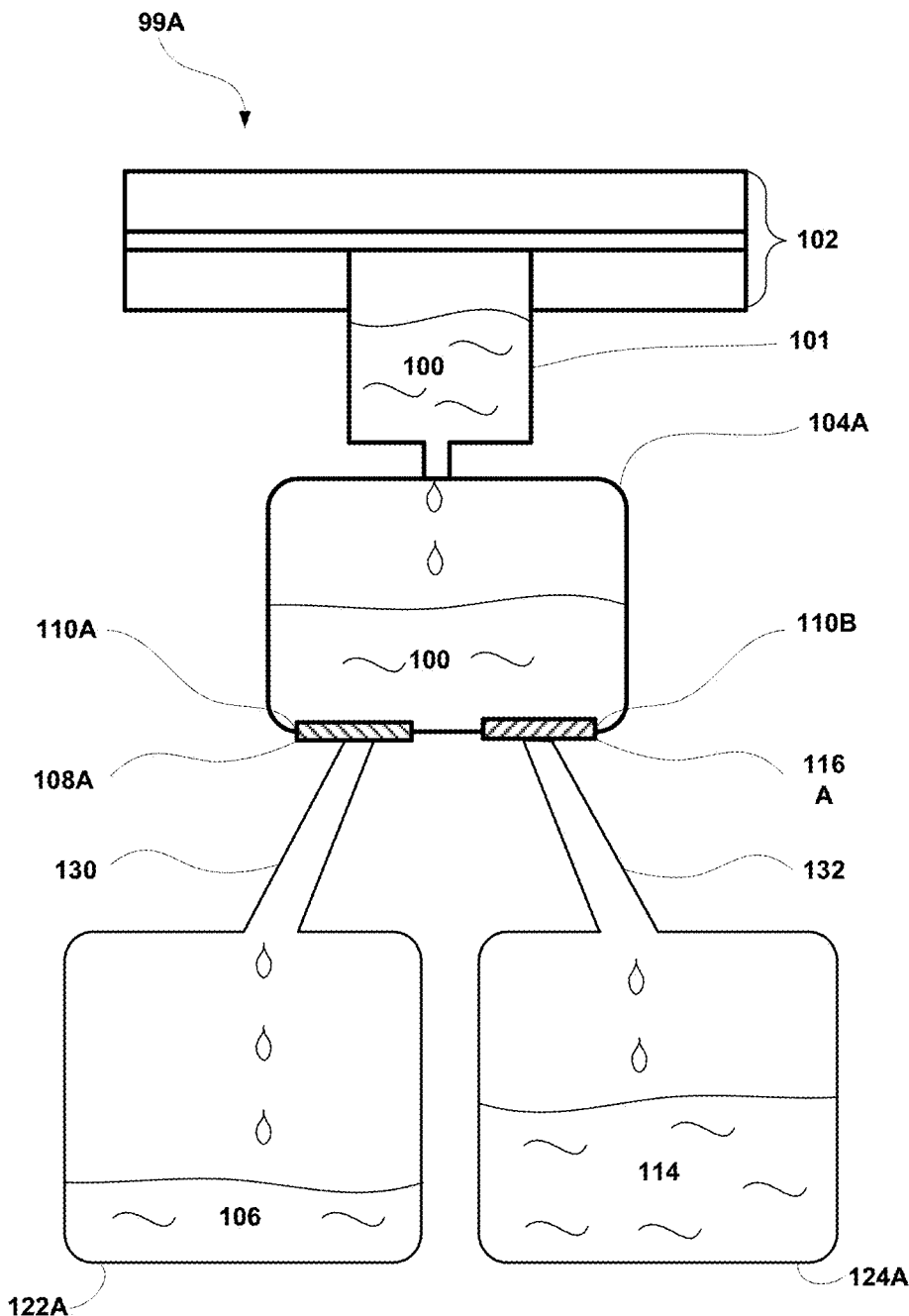

FIG. 19 shows a schematic illustration of another embodiment of the present teachings showing an exemplary apparatus gravity-assisted capillary force driven separation (CFDS) apparatus used for the continuous separation of water-in-hexadecane emulsions. The emulsion is fed into a glass tube at a constant rate using a syringe pump. Two distinct separation membranes are provided to pass water-rich permeate through a first hydrophilic and oleophobic membrane along a bottom of a feeding chamber and hexadecane-rich permeate passes through a second hydrophobic and oleophilic membrane likewise disposed on the bottom of the feeding chamber. As such, the water-rich permeate and the hexadecane rich permeate are separated and collected in parallel (side-by-side) collectors.

Figure 20:
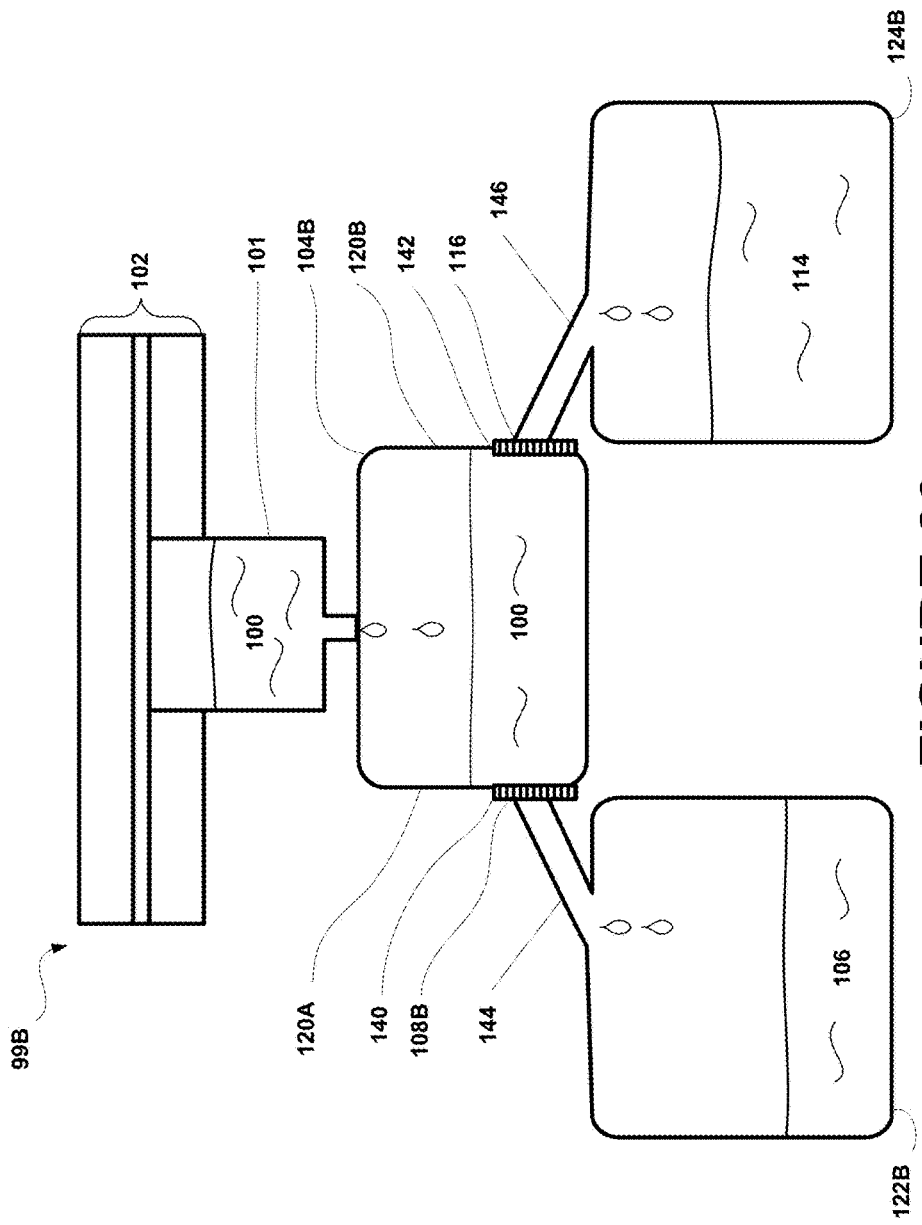

FIG. 20 shows a schematic illustration of yet another embodiment according to the present teachings with an exemplary apparatus gravity-assisted capillary force driven separation (CFDS) apparatus used for the continuous separation of emulsions, such as a water-in-hexadecane emulsion. The emulsion enters a feeding chamber and is fed at a constant rate via a syringe pump. Two distinct separation membranes are provided to pass water-rich permeate through a first hydrophilic and oleophobic membrane disposed in a sidewall of the feeding chamber along a first side and hexadecane-rich permeate passes through a second hydrophobic and oleophilic membrane likewise disposed in a sidewall along a second side opposite to the first side of the feeding chamber. As such, the water-rich permeate and the hexadecane rich permeate are separated and collected in parallel (side-by-side) collectors.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. Further, the present disclosure contemplates that any particular feature or embodiment can be combined with any other feature or embodiment described herein. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise.

The terms "comprises," "comprising," "including," and "having," are inclusive and therefore specify the presence of stated features, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

As referred to herein, the word "substantially," when applied to a characteristic of a composition or method of this disclosure, indicates that there may be variation in the characteristic without having a substantial effect on the chemical or physical attributes of the composition or method.

As used herein, the term "about," when applied to the value for a parameter of a composition or method of this disclosure, indicates that the calculation or the measurement of the value allows some slight imprecision without having a substantial effect on the chemical or physical attributes of the composition or method. If, for some reason, the imprecision provided by "about" is not otherwise understood in the art with this ordinary meaning, then "about" as used herein indicates a possible variation of up to 5% in the value.

When an element or layer is referred to as being "on," "contacting," "engaged to," "connected to," or "coupled to" another element or layer, it may be directly on, engaged, contacting, connected, or coupled to the other element or layer, or intervening elements or layers may be present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, and the like may be used herein to describe various components, moieties, elements, regions, layers and/or sections, these components, moieties, elements, regions, layers and/or sections are not exclusive and should not be limited by these terms. These terms may be only used to distinguish one component, moiety, element, region, layer or section from another component, moiety, element, region, layer or section. Terms such as "first," "second," and other numerical terms when used herein do not imply a sequence or order unless clearly indicated by the context. Thus, a first component, moiety, element, region, layer or section discussed below could be termed a second component, moiety, element, region, layer, or section without departing from the teachings of the example embodiments.

Spatially relative terms, such as "bottom," "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In various aspects, the present disclosure provides novel porous materials that have vast applicability for numerous applications, such as liquid-liquid separations. For example, as will be discussed in further detail below, the inventive technology can be employed to separate immiscible liquid components, like oil and water from a liquid-liquid mixture. Further, the inventive technology can be employed to separate certain miscible liquid components. As used herein, a "mixture" encompasses not only solutions having components (e.g., phases, moieties, solvents, solutes, molecules, and the like) that are homogenously mixed together, but also combinations of components or materials that are not necessarily evenly, homogeneously, or regularly distributed when combined (e.g., unevenly mixed combinations of components, separated layers of immiscible components, unevenly distributed suspensions, and the like).

Membrane-based technologies are attractive for separation of immiscible liquid components, such as emulsion separation, because they are relatively energy-efficient, cost-effective, and applicable across a wide range of industrial effluents. Most separation membranes are classified as either hydrophobic or hydrophilic. Their wettability with oil is often not considered or specified because in nearly all cases, such membranes are oleophilic (for example, having a Young's contact angle with oil ($\theta_{oil}$) of less than 90°. Hydrophobic, superhydrophobic, and oleophilic membranes, which preferentially allow the passage of oil, are most often used in relatively energy-intensive cross-flow filtration systems, but are not used in other conventional types of filtration systems. Separator membrane surfaces that exhibit superhydrophobicity and oleophilicity have been used to separate oil and water, but are particularly unsuitable for continuous separation under gravity, because water settles down towards the separator membrane (since water has a higher density than the oil components). The settled water forms a barrier layer along the membrane adjacent to the oil phase, so that the water layer prevents oil permeation, thus impeding or halting passage of the oil from the liquid-liquid mixture through the membrane. Further, during separation, hydrophobic or superhydrophobic membranes are easily fouled by oil. On the other hand, although hydrophilic membranes can be used for gravity-assisted separation and are less likely to be fouled; they are unsuitable for the separation of water-in-oil emulsions or for the separation of free oil and water, as both oil and water can easily permeate through the membranes.

Mixtures of oil and water are separated into three categories based on the average size or diameter of oil droplet ($d_{oil}$), namely a "free oil" if $d_{oil}$ greater than about 150 micrometers (μm), a "dispersed oil" if diameter $d_{oil}$ is less than about 150 μm and greater than about 20 μm, and an "emulsified oil" if $d_{oil}$ is less than about 20 μm. In certain aspects of the present disclosure, a treated liquid-liquid mixture comprises an emulsion of oil and water, for example, an oil-in-water emulsion (where water is the continuous phase and oil is the dispersed phase) or a water-in-oil emulsion (where oil is the continuous phase and water is the dispersed phase).

Typically, such oil and water emulsions are created by use of surface-active agents, like surfactants and detergents that stabilize the dispersed phase in smaller droplets. The hydrophilic-lipophilic balance (HLB) of a surfactant used in a surfactant-stabilized mixture of oil and water can be used to predict the formation of either an oil-in-water or a water-in-oil emulsion. However, depending on the concentration of the dispersed phase and/or the temperature of the system, an oil-in-water emulsion may invert to a water-in-oil emulsion or vice-versa (a water-in-oil emulsion inversion to an oil-in-water emulsion). In addition, as many as three different phases (oil, oil-in-water emulsion or water-in-oil emulsion, and water) may co-exist in oil-water mixtures. Generally to affect gravity-assisted separation of all types of oil-water mixtures, a separation membrane is ideally both hydrophilic and oleophobic when in contact with air and also when submerged under water. However, for conventional membrane materials, it has been observed that a material that is oleophobic in air typically loses its oleophobicity under water and vice-versa. This behavior along with the presence of stabilizing surface active agents makes separation of aqueous and oleophilic phases (including oil) from such emulsions particularly challenging. Conventional gravity separators and skimming techniques are unable to separate emulsions. However, the inventive technology provides novel materials that are capable of successfully separating not only free oil and water mixtures but also emulsions into water and oil phases, even those that include surfactants, as will be described in greater detail below.

In accordance with the present teachings, novel oleophobic, yet superhydrophilic porous materials have been developed that can be successfully employed as a separator membrane for various components, such as oil and water combinations, including those that have been stabilized by surface active agents. The inventive materials are particularly well suited for continuous separation under gravity. In certain variations, the inventive materials can be used as a separation membrane that is both hydrophilic (or superhydrophilic) and oleophobic (or superoleophobic) when in contact with air and also when submerged under water. In certain embodiments, the inventive materials can be used as a separator membrane in a separator device, so that water readily contacts and permeates the porous membrane due to its superhydrophilicity, while the oleophobicity prevents the passage of oil, resulting in efficient separation of a filtrate. Using the inventive porous materials as membranes, oil-water mixtures and surfactant-stabilized oil-in-water and water-in-oil emulsions can be separated into clean water and clean oil.

In certain variations, an efficiency of separation using the inventive materials as a separator membrane is greater than or equal to about 85%, optionally greater than or equal to about 90%, optionally greater than or equal to about 95%, optionally greater than or equal to about 97%, optionally greater than or equal to about 99%, optionally greater than or equal to about 99.5%, and in certain preferred aspects, optionally greater than or equal to about 99.9% for free oil mixtures or for emulsions (including surfactant stabilized emulsions), as will be described in more detail below. Various embodiments of the present teachings can likewise be used as membrane separators for other immiscible or miscible component mixtures, such as mixtures of polar and non-polar liquids, like alcohols and alkane mixtures, by way of non-limiting example. Additional non-limiting exemplary areas of applicability include separation of produced water, clean-up of water discharge from oil refineries, waste water treatment, clean-up of oil spills, and the like. Furthermore, the inventive materials can also be used to separate certain miscible components from liquid-liquid mixtures.

By way of background, superhydrophobicity is pervasive in nature with various plant leaves, legs of the water strider, gecko's feet, troughs on the elytra of desert beetles and insect wings displaying this super-repellency to water. However, naturally occurring superoleophobicity is extremely rare because oils tend to have low surface tension and consequently display low contact angles (as discussed in more detail below). Furthermore, oleophobic and superoleophobic surfaces are generally hydrophobic and/or superhydrophobic, because the surface tension of water is significantly higher than that of oils. Due to the inherent difficulty in making superoleophobic surfaces, most work on developing super-repellent surfaces has focused on water drops.

The simplest measure of wetting on a smooth (non-textured) surface is the equilibrium contact angle θ, given by the Young's equation as, $$\cos\theta = \frac{Y_{SV} - Y_{sl}}{Y_{lv}} \quad \text{(Equation 1)}$$

where, the surface tension of the liquid is $\gamma_{lv}$, the surface energy of the solid is ($\gamma_{sv}$), and the solid-liquid interfacial energy is ($\gamma_{sl}$). Surfaces that display contact angles θ greater than about 90° with water are considered to be hydrophobic and surfaces that display contact angles greater than 90° with oil are considered to be oleophobic.

Surfaces that spontaneously approach a contact angle θ of 0° with water and oil are generally considered superhydrophilic and superoleophilic respectively and surfaces that approach contact angles θ greater than about 150° and low contact angle hysteresis (difference between the advancing $\theta_{adv}$ and the receding contact angle $\theta_{rec}$) with water and oil are generally considered to be superhydrophobic and superoleophobic, respectively.

As used herein, surfaces that display a contact angle θ of less than or equal to about 5°, optionally of less than or equal to about 4°, optionally of less than or equal to about 3°, optionally of less than or equal to about 2°, optionally of less than or equal to about 1°, and in certain aspects, 0° with water are considered to be "superhydrophilic."

Surfaces that display a contact angle of greater than or equal to about 90°, optionally greater than or equal to about 95°, optionally greater than or equal to about 100°, optionally greater than or equal to about 105°, optionally greater than or equal to about 110°, optionally greater than or equal to about 115°, optionally greater than or equal to about 120°, optionally greater than or equal to 125°, optionally greater than or equal to about 130°, optionally greater than or equal to about 135°, optionally greater than or equal to about 130°, optionally greater than or equal to about 140°, and in certain aspects, optionally greater than or equal to about 145° with a preselected oil are considered to be "oleophobic." A "preselected oil" is intended to include any oil or combinations of oils of interest, such as those that are present in a non-polar or oleophilic phase that is to be separated from an aqueous phase in a liquid-liquid mixture. As discussed herein, in certain non-limiting variations, an exemplary preselected oil used to demonstrate oleophobicity/oleophilicity is rapeseed oil (RSO).

Due to the low surface tension values for oils, in spite of numerous known natural superhydrophobic surfaces, there are no known, naturally-occurring, superoleophobic surfaces. Superoleophobic surfaces are those that display a contact angle of greater than or equal to about 150°, optionally greater than or equal to about 151°, optionally greater than or equal to about 152°, optionally greater than or equal to about 153°, optionally greater than or equal to about 154°, optionally greater than or equal to about 155°, optionally greater than or equal to about 156°, optionally greater than or equal to about 157°, optionally greater than or equal to about 158°, optionally greater than or equal to about 159°, and in certain aspects, optionally greater than or equal to about 160° along with low contact angle hysteresis (difference between the advancing $\theta_{adv}$ and the receding contact angle $\theta_{rec}$) with preselected low surface tension liquids, such as a representative oil (for example, rapeseed oil (RSO)). In certain variations a "superoleophobic" surface has a contact angle of greater than or equal to about 150° and less than or equal to about 180° with a preselected oil, like representative RSO oil.

Oleophobic and superoleophobic surfaces are generally hydrophobic and/or superhydrophobic, because the surface tension of water is significantly higher than that of oils. In accordance with the principles of the present teachings, however, the presence of specific intermolecular interactions (hydrogen bonding, dipole-dipole interactions, and the like) at the solid-liquid interface and the magnitude of a solid-liquid interfacial energy ($\gamma_{sl}$) for water can be significantly lower than for oil. By employing such design principles on a porous material surface, the inventive materials provide oleophobic, yet hydrophilic surfaces; optionally oleophobic, yet superhydrophilic surfaces; and in certain variations, superoleophobic, yet superhydrophilic surfaces. In accordance with the principles of the present disclosure, re-entrant surface texture can be pre-selected in combination with surface chemistry modification to create low energy surfaces that can support a robust composite (solid-liquid-air) interface and display apparent contact angles greater than or equal to about 90° and in certain variations greater than or equal to about 150° with various low surface tension liquids. Surfaces displaying such functionality have vast applicability in a variety of fields, including commercial applications for liquid-liquid separation.

When a liquid contacts a porous (or textured) surface, it exhibits an apparent advancing contact angle θ° that can be significantly different from the equilibrium contact angle. If the liquid fully penetrates the porous surface, it is said to be in the Wenzel state. If the liquid does not penetrate completely, a composite (solid-liquid-air) interface forms below the drop and it considered to be in the Cassie-Baxter state. In certain variations of the present disclosure, the super-repellent surfaces have a surface geometry that promotes the Cassie-Baxter state. In the Cassie-Baxter state, liquid wets the porous surface up to the point where the local texture angle becomes equal to the equilibrium contact angle.

In accordance with certain aspects of the present teachings, a porous material substrate is selected to have such a desirable re-entrant surface texture (a line projected normal to the surface intersects the texture more than once), which can then be coupled with novel surface coatings to result in a low energy surface that is oleophobic, and optionally superoleophobic. By further design (for example, by selection or manipulation of the surface of the porous substrate), the oleophobicity of the surface can be preselected and tuned, for example, by preselecting a robustness factor (A*) and dimensionless spacing ratio (D*) to provide the desired oleophobicity.

Physically, A* is a measure of the pressure that the composite interface can withstand before transitioning (at A*=1) from the Cassie-Baxter state to the Wenzel state. Large values of the robustness factor (A*>>1) indicate the formation of a robust composite interface that can withstand a very high pressure. On the other hand, for A*<1, the composite interface cannot maintain its stability against even small pressure differentials, causing the liquid to completely penetrate the porous surface, leading to the Wenzel state. Physically, D* is a measure of the air entrapped below the composite interface. For textures that are dominated by cylindrical fiber-like features, such as the porous geometries suitable for use as substrates in the present teachings, these design parameters are defined as, $$A^* = \frac{R l_{cap}}{D^2} \frac{1-\cos\theta}{1+2(R/D)\sin\theta} \quad \text{(Equation 2)}$$

$$D^* = \frac{R+D}{R} \quad \text{(Equation 3)}$$

where, R is the fiber radius, 2D is the inter-fiber spacing, and $l_{cap}$ is the capillary length of the liquid that is defined as, $$l_{cap} = \sqrt{\gamma_{lv}/\rho g} \quad \text{(Equation 4)}$$

where, g is acceleration due to gravity and ρ is the density of the liquid. The Cassie-Baxter relationship, which relates the apparent contact angle θ* to the equilibrium contact angle θ can be expressed in terms of D* as, $$\cos\theta^* = -1 + \frac{1}{D^*}[\sin\theta + (\pi - \theta)\cos\theta]. \quad \text{(Equation 5)}$$

As can be observed from Equation 5, higher values of D* correspond to a higher fraction of air in the composite interface and consequently an increase in θ* for a given liquid. D* only depends on geometry, whereas A* depends on the geometry, as well as the liquid and the solid surface. In certain aspects of the present teachings, a superhydrophilic surface can be designed where $A^*_{water}<1$ irrespective of D* and that a superoleophobic surface has $A^*_{oil}>>1$ and a high value for D*.

In certain aspects, the present teachings contemplate systematic design of separator membranes for oil-water separation by controlling design of two physical characteristics: first, a surface porosity of the membrane material—which is related to a rate of permeation of one phase (e.g., water) through the membrane, and secondly, a magnitude of the breakthrough pressure ($P_{breakthrough}$), which is a maximum pressure difference across the membrane below which the membrane can prevent the permeation of (or retain) a second phase (e.g., oil).

For example, for substrates possessing a cylindrical texture, such as in certain embodiments of the present teachings, higher values of spacing ratio D* also imply that a membrane surface will be highly non-wetting (in other words, the contacting liquids will display high apparent contact angles (θ*) on the membrane), as long as the applied pressure difference across the membrane ($P_{applied}$) is less than breakthrough pressure ($P_{breakthrough}$). In other words, $P_{applied} < P_{breakthrough}$ where $P_{applied}$ is the applied pressure and $P_{breakthrough}$ is the pressure at which the incompatible phase will permeate the porous substrate. The robustness factor A* can also be expressed as a ratio of $P_{breakthrough}$ and a reference pressure $P_{ref} = 2\gamma_{lv}/l_{cap}$. As noted above, $l_{cap} = \sqrt{\gamma_{lv}/\rho g}$, which is the capillary length for the liquid. Reference pressure ($P_{ref}$) is close to a minimum possible pressure that may be applied on a membrane by commonly occurring liquid droplets or puddles. As a result, any membrane with A*≤1 for a given contacting liquid cannot prevent the liquid from permeating through it, while values of A*>>1 imply a high resistance to liquid permeation. For surfaces possessing a cylindrical texture, the robustness factor can be given by:

$$A^* = \frac{P_{breakthrough}}{P_{ref}} = \frac{Rl_{cap}}{D^2} \frac{(1-\cos\theta)}{(1+2(R/D)\sin\theta)}. \quad \text{(Equation 6)}$$

In this manner, A* and D* can be preselected in a manner that permits the tuning of the surface(s) of a porous material to obtain desirable superhydrophilicity and oleophobicity.

Accordingly, in various aspects the present disclosure provides a porous material comprising a porous substrate having a surface that is both hydrophilic and oleophobic. In certain particularly advantageous aspects, the present disclosure provides a material comprising a porous substrate having a surface that is both superhydrophilic and oleophobic. For example, the superhydrophilic surface has a first apparent advancing dynamic contact angle of less than or equal to about 5° for water and the oleophobic surface has a second apparent advancing dynamic contact angle of greater than or equal to about 90° for a preselected oil, like representative rapeseed oil. In certain variations, the first apparent advancing dynamic contact angle of less than or equal to about 5° for water occurs in the presence of water. In certain variations, the second apparent advancing dynamic contact angle of greater than or equal to about 90° for the oil occurs in both air and in the presence of water.

A dynamic contact angle can be measured on a drop that is in motion, for example, while the drop is being added to or removed from the surface or where the drop is applied and a tilt is occurring. Advancing and receding dynamic contact angles can be measured by using a sessile drop method of measuring dynamic contact angles where a syringe places a drop of liquid on the test specimen where its profile is viewed using a goniometer (FIG. 1). To measure the advancing contact angle, the volume of the drop is increased from the syringe so that the drop expands and the liquid front advances on the test substrate. To measure the receding contact angle, the volume of the drop is decreased so that the drop contracts and the liquid front recedes on the test substrate. See the exemplary schematic in FIG. 1 showing techniques for determining dynamic advancing angle $\theta_{adv}$ and dynamic receding angle $\theta_{rec}$. The difference between the advancing and receding angles $\theta_{adv}$ and $\theta_{rec}$ is the contact angle hysteresis.

The dynamic apparent contact angle measurements can be measured by using goniometer (such as a commercially available Ramé-Hart 200-F1). The advancing contact angles can be measured with a typical error of ±2° by advancing a small volume of liquid (about 5 μL) onto a surface using a 2 mL micrometer syringe (commercially available from Gilmont).

In certain aspects, the present disclosure provides a porous material comprising a porous substrate having a surface that is both superhydrophilic and superoleophobic. For example, the superhydrophilic surface has a first apparent advancing dynamic contact angle of less than or equal to about 5° for water and the superoleophobic surface has a second apparent advancing dynamic contact angle of greater than or equal to about 150° for a preselected oil, like representative rapeseed oil. In certain variations, the first apparent advancing dynamic contact angle of less than or equal to about 5° for water occurs in the presence of water. In certain variations, the second apparent advancing dynamic contact angle of greater than or equal to about 150° for the oil occurs in both air and in the presence of water.

In various aspects, the inventive material comprises a porous substrate material. In certain aspects, the porous substrate is highly porous (e.g., of greater than about 1% to less than or equal to about 99%, optionally having a porosity of greater than about 10% to less than or equal to about 95%), having a plurality of pores formed within a body of the material. The plurality of pores includes a plurality of internal pores and external pores that are open to one another and form continuous flow paths or channels through the substrate body extending from a first external surface to a second external surface. As used herein, the terms "pore" and "pores" refers to pores of various sizes, including so-called "macropores" (pores greater than 50 nm diameter) and "mesopores" (pores having diameter between 2 nm and 50 nm), unless otherwise indicated, and "pore size" refers to an average or median value, including both the internal and external pore diameter sizes. In various aspects, the porous substrate comprises a plurality of pores having an average pore size diameter of greater than or equal to about 10 nm to less than or equal to about 1 mm, optionally greater than or equal to about 20 nm to less than or equal to about 10 μm; optionally greater than or equal to about 30 nm to less than or equal to about 5 μm; optionally greater than or equal to about 40 nm to less than or equal to about 1 μm. In certain variations, an average pore size diameter of the plurality of pores in the substrate material is selected to be greater than or equal to about 10 nm to less than or equal to about 1 mm, optionally greater than or equal to about 50 nm to less than or equal to about 500 nm.

The coating materials of the present disclosure applied to the surface of the substrate material (described in more detail below), are generally compatible with a wide range of substrate materials. Therefore, in certain exemplary embodiments, a porous substrate can be constructed from a material selected from the group consisting of polymeric materials, organic materials (such as materials derived from plants or animals), metallic materials, inorganic materials, and combinations thereof. In certain aspects, the porous substrate is constructed from one or more materials selected from the group consisting of screen, mesh, paper, woven cloth (e.g., cloth or fabric), non-woven cloth (e.g., felt), fiber, foam, molecular sieves, entangled nanowires, and electrospun polymeric nanofibers, and combinations thereof. Any porous substrate known or to be discovered in the art that is suitable as a membrane separator and compatible with the coating materials is further contemplated by the present disclosure.

Non-limiting examples of suitable porous substrates include, by way of non-limiting example, an exemplary stainless steel mesh having an average pore size of 140 μm (e.g., stainless steel mesh size 100×100 commercially available from McMaster Carr). The mesh number refers to the number of openings per inch. Thus, stainless steels having mesh sizes of 100 (R=56.5 μm, 2D=138 μm, D*=2.2), 400 (R=12.5 μm, 2D=37.5 μm, D*=2.5), or 500 (R=10.2 μm, 2D=30.5 μm, D*=2.5) are all suitable for use as a porous substrate in accordance with various aspects of the present disclosure. Commercial polyester fabrics, such as commercially available ANTICON™ 100 clean-room wipes sold by VWR, have a nominal pore size of 300 μm and therefore are suitable porous substrates. Cellulose filter papers, having a nominal pore size of 2.5 μm, such as 42 cellulose filter papers commercially available from Whatman. Another suitable example includes millipore nitrocellulose filter membranes having a nominal pore size of 220 nm, commercially available from Fisher Scientific. Yet other suitable substrate materials include polycarbonate filter membranes, such as a first polycarbonate filter membrane having a nominal pore size of 50 nm or a second polycarbonate filter membrane having a nominal pore size of 600 nm, both of which are commercially available as SPI-Pore from SPI.

In accordance with various aspects of the present disclosure, the surfaces are optionally further manipulated by employing at least two distinct components to form a coating on the porous substrate surface. One of the coating components is selected to have a very low surface energy, thereby making it both hydrophobic and oleophobic when applied to the surface of the porous substrate. The other coating component is selected to have a high surface energy and desirably a specific intermolecular interaction (for example, the material is capable of electrostatic interaction with a charged or polar moiety or the material is capable of hydrogen bonding with a polar moiety), thus this material can cause the porous substrate to be hydrophilic. Based on these principles and as further described herein, new porous materials with engineered superhydrophilic and oleophobic (or superoleophobic) surfaces are provided.

In various aspects, the present teachings include methods of making a superhydrophilic and oleophobic porous material by applying a first material and a second distinct material to a region of a surface of a porous substrate. In certain aspects, the region to which the materials are applied on the surface may be one or more regions of a major surface or may include multiple surfaces. In various aspects, the first material is capable of hydrogen bonding or electrostatically interacting with a polar or charged moiety. In various aspects, the second distinct material is a low surface energy material. Notably, the materials applied to the surface of the porous substrate may include multiple first and second materials and may further include additional materials. After the first and second materials are applied to the surface of the porous substrate, the region to which the materials are applied is rendered both superhydrophilic (e.g., having a first apparent advancing dynamic contact angle of less than or equal to about 1° for water) and oleophobic (e.g., having a second apparent advancing dynamic contact angle of greater than or equal to about 90° for a preselected oil, such as representative rapeseed oil). In yet other variations, after the first and second materials are applied to the surface of the porous substrate, the region to which the materials are applied is rendered both superhydrophilic (e.g., having a first apparent advancing dynamic contact angle of less than or equal to about 1° for water) and superoleophobic (e.g., having a second apparent advancing dynamic contact angle of greater than or equal to about 150° for a preselected oil, like representative rapeseed oil).

In certain aspects, the first material is a material capable of hydrogen bonding with a polar or charged moiety, such as water. Particularly suitable examples of such materials include polymers that have been cross-linked by the inclusion of the diacrylic esters or dimethacrylic esters of ethylene glycol monomers and polymers, such as the acrylates and dimethacrylates of polyethylene glycol, namely poly(ethylene glycol) diacrylate (PEGDA), or poly(ethylene glycol) dimethacrylate. Other suitable materials for hydrogen-bonding include polyvinylpyrrolidone (PVP), which generally refers to a polymer containing vinyl pyrrolidone (also referred to as N-vinylpyrrolidone, N-vinyl-2-pyrrolidione, and N-vinyl-2-pyrrolidinone) as a monomeric unit. Yet other suitable hydrophilic polymers include poly(N-isopropyl acrylamide), polyvinyl alcohol (PVA), polyepoxysuccinic acid and its salt derivatives, alkylsuccinic polyglyceride, glycerol alkoxylate, polyalkyloxazoline, and poly(allylamine). Other materials known or to be discovered in the art are likewise contemplated to provide desired hydrogen bonding.

In yet other aspects, the first material is a charged polymeric material capable of electrostatically interacting with a charged moiety or species, such as a polyelectrolyte. Exemplary charged polymers includes polyelectrolytes and p- and n-type doped conducting polymers. Charged polymeric materials include both polycationic (having positive charges) and polyanionic (having negative charges) polymeric materials. In various aspects of the present teachings, the first material comprises at least one polyelectrolyte.

A polyelectrolyte is a polymeric macromolecule in which a substantial portion of the constitutional units (e.g., monomers) contain ionic or ionizable groups, or both. Suitable polyelectrolytes for use in the methods of the present disclosure are hydrophilic, synthetic, biologic, or of non-biologic origin. By way of non-limiting example, examples of suitable polyelectrolytes include sulfonic acid based co-polymers, such as poly(vinyl sulfonic acid) (PVS) or sodium polystyrene sulfonate (PSS), and carboxylic acid based co-polymers, such acrylic or methacrylic acid based polymers, such as poly(acrylic acid) (PAA); acrylic acid-acrylate copolymers; acrylic acid-acrylamide copolymers, like poly(acrylamide acrylic acid) (PAAm) and poly(acrylamide-co-acrylic acid) ((PAAm-co-AA)—also referred to as PAAm-AA); acrylamide-sulfonic acid copolymers (2-acrylamido-2-methyl-1-propane sulfonic acid (APSA)), acrylic acid-olefin copolymers; acrylic acid-vinyl aromatic copolymers; acrylic acid-styrene sulfonic acid copolymers; acrylic acid-vinyl ether copolymers; acrylic acid vinyl acetate copolymers; acrylic acid-vinyl alcohol copolymers; polymers of methacrylic acid (e.g., polymethyl methacrylates (PMMA)) or copolymers of methacrylic acid with any of the above monomers; copolymers of maleic acid, fumaric acid and their esters with all of the above with all of the above monomers/co-monomers; copolymers of maleic anhydride with all of the above monomers/co-monomers; and the salt forms of all of the above.

Other polymers well-suited for use as polyelectrolytes in accordance with the present teachings include those having ammonium groups, such as quaternary ammonium groups, or amine groups. One example of such a polyelectrolyte includes polyethylene imine (PEI). In other aspects, polymers that include weak or strong acid groups, such as sulfate, sulfonate, phosphate, phosphonate, and/or carboxylate, are suitable polymers as polyelectrolytes. In yet another embodiment, polymers that include zwitter-ionic groups, i.e., having both positively and negatively charged groups in the same polymeric monomer or entity, are likewise suitable for use as polyelectrolytes. In certain alternate aspects, suitable polyelectrolytes may include natural or synthetic polypeptides, which include chains of peptides (amino acids linked via peptide bonds) that may include without limitation charged amino acid groups, such as arginine, asparagine, aspartic acid, glutamic acid, glutamine, histidine, lysine, serine, threonine, and/or tyrosine, and the like. In yet other aspects, blends and mixtures of any of the above mentioned polymers may be used as suitable polyelectrolytes as the first material.

Particularly suitable polyelectrolyte polymers for use as the first material include polyacrylic acid (PAA), poly(acrylamide acrylic acid (PAAm), and/or poly(acryl amide-co-acrylic acid) (PAAm-AA), sodium polystyrene sulfonate (PSS), polyethylene imine (PEI), polypeptides, copolymers, and combinations thereof.

Thus, in certain variations, the first material is optionally selected from the group consisting of: poly(ethylene glycol) diacrylate (PEGDA), poly(ethylene glycol) dimethacrylate (PEGDMA), polyvinylpyrrolidone (PVP), poly(N-isopropyl acrylamide), polyacrylic acid (PAA), poly(acrylamide acrylic acid (PAAm), poly(acryl amide-co-acrylic acid) (PAAm-AA), polyvinyl alcohol (PVA), polyepoxysuccinic acid and its salt derivatives, alkylsuccinic polyglyceride, glycerol alkoxylate, polyalkyloxazoline, poly(allylamine), sodium polystyrene sulfonate (PSS), polyethylene imine (PEI), polypeptides, copolymers, and combinations thereof. Other materials known or to be discovered by those of skill in the art are likewise contemplated to provide such polyelectrolyte or charged materials.

In certain aspects, the second material has a low surface energy and may be selected to be a silsequioxane derivative. "Silsequioxane" is the general name for a family of polycyclic compounds consisting of silicon and oxygen. Silsequioxanes are also known as silasesquioxanes and polyhedral oligomeric silsesquioxanes and are abbreviated "POSS." In certain variations, a particularly preferred second material comprises 1H,1H,2H,2H-heptadecafluorodecyl polyhedral oligomeric silsequioxane (F-POSS=8 mN/m). In certain aspects, the addition of F-POSS leads to a rapid reduction in the overall surface energy of the porous substrate (for example, to an estimated $\gamma_{sv}$=10 mN/m). Other suitable second low surface energy second materials include materials having a surface energy of less than or equal to about 25 mN/m, and in certain variations, a surface energy of greater than or equal to about 6 mN/m to less than or equal to about 25 mN/m at standard pressure and temperature conditions. In certain alternate variations, such materials include, by way of non-limiting example, such materials include graphite fluoride or organofluorine compounds such as perfluorodecanethiol, polytetrafluoroethylene, and/or fluoro surfactants, fluorosilanes, derivatives, and combinations thereof. Thus, in certain variations, the second material is optionally selected from the group consisting of: 1H,1H, 2H,2H-heptadecafluorodecyl polyhedral oligomeric silsequioxane (F-POSS), perfluorodecyl trichlorosilane and perfluorodecyl dimethyl chlorosilane, graphite fluoride, perfluorodecanethiol, derivatives, and combinations thereof. Other materials that provide very low surface energies known or to be discovered by those of skill in the art are likewise contemplated.

A ratio of the first coating material to the second low surface energy coating material in the precursor may vary depending upon the application; however, in certain embodiments, a weight ratio of the first material to the second low surface energy material may be 100:1 to 1:100; optionally from 10:1 to 1:10; optionally from 7:1 to 3:1; and in certain aspects, optionally from 5:1 to 4:1.

In certain variations, the first material is provided in the coating formed from the precursor at greater than or equal to about 1 weight % to less than or equal to about 99.9 weight %; optionally from greater than or equal to about 30 weight % to less than or equal to about 99 weight %; optionally from greater than or equal to about 50 weight % to less than or equal to about 99 weight %; optionally from greater than or equal to about 60 weight % to less than or equal to about 98 weight %; optionally from greater than or equal to about 65 weight % to less than or equal to about 95 weight %; optionally from greater than or equal to about 70 weight % to less than or equal to about 90 weight %; optionally from greater than or equal to about 75 weight % to less than or equal to about 90 weight %; optionally from greater than or equal to about 80 weight % to less than or equal to about 90 weight %; and in certain variations about 80 weight %.

Likewise, in certain variations, the second low surface energy material is provided in the coating formed from the precursor at greater than 0% by weight of the precursor; optionally greater than or equal to about 0.1 weight % to less than or equal to about 99 weight %; optionally from greater than or equal to about 0.1 weight % to less than or equal to about 80 weight %; optionally greater than or equal to about 0.5 weight % to less than or equal to about 50 weight %; optionally from greater than or equal to about 1 weight % to less than or equal to about 40 weight %; optionally from greater than or equal to about 2 weight % to less than or equal to about 25 weight %; optionally from greater than or equal to about 3 weight % to less than or equal to about 23 weight %; optionally from greater than or equal to about 5 weight % to less than or equal to about 21 weight %; optionally from greater than or equal to about 15 weight % to less than or equal to about 21 weight %; and in certain variations about 20 weight %.

Thus, in certain aspects, a ratio of the first material to the second low surface energy material in the coating formed from the precursor optionally is about 10:1 to about 1:5, optionally about 7:1 to about 1:1, and optionally about 5:1 to about 2:1, and in certain variations, about 4:1 of the first material to the second low surface energy material.

In certain aspects, the disclosure provides a method of applying a precursor comprising the first material, the second low surface energy material, and optionally a crosslinker as well to a substrate. As appreciated by those of skill in the art, other conventional components may be included in the coating precursor, so long as they do not significantly impact the hydrophilicity or oleophobicity of the ultimate coating formed, such as solvents, carriers, antioxidants, anti-foaming agents, stabilizers, or other standard additives, like flow additives, rheology modifiers, adhesion promoters, and the like. The precursor can be applied to the surface of the substrate by using any conventional coating technique including dip coating, flow coating, spin coating, roll coating, curtain coating, and spray coating. In certain variations, a thickness of the coating is greater than or equal to about 10 nm to less than or equal to about 10 μm. Such a thickness may be measured from an external surface of the coating inwards into the body of the substrate, for example. In certain embodiments, the precursor may form a coating that permeates the substrate, including coating substantially all of the internal pores.

In certain variations, the precursor is applied by dip coating in a dip coater. After such a precursor is applied to the surface of the porous substrate, any solvents or carriers can be removed by volatilizing, drying, heating, reducing pressure/pulling a vacuum, and the like. Further, in certain aspects, the methods may also include further subjecting the surface of the porous substrate to a cross-linking process. Any of the polymers applied to the surface of the porous substrate may be cross-linked by application of heat, actinic radiation or other methods of curing and treating polymers known to those of skill in the art.

In certain particularly advantageous embodiments, the porous substrate has a precursor applied to at least one region of the surface. The treated region thus comprises a first material comprising poly(ethylene glycol) diacrylate (PEDGA), a second material comprising 1H,1H,2H,2H-heptadecafluorodecyl polyhedral oligomeric silsequioxane (F-POSS), and a cross-linker comprising 2-hydroxy-2-methyl propiophenone. After cross-linking, the precursor forms a superhydrophilic and superoleophobic region on the surface.

Example A

Two exemplary porous materials having superoleophobic, yet superhydrophilic surfaces are prepared as follows. A first porous substrate of stainless steel mesh having a mesh size 100×100 (Radius (R)=57 µm, inter-fiber spacing 2D=140 µm, D*=2.2) available from McMaster Carr is selected. A second porous substrate is a polyester fabric commercially available as ANTICON 100™ clean-room wipes ($R_{bundle}$=150 µm, $2D_{bundle}$=300 µm, $R_{fiber}$=5 µm, $2D_{fiber}$=20 µm, D*=6) commercially available from VWR.

A first hydrophilic material, poly(ethylene glycol) diacrylate (PEGDA) of $M_n$ of about 700 Daltons (Da) is used in the coating precursor, along with a 2-hydroxy-2-methyl propiophenone cross-linker (commercially available as DAROCUR 1173™ cross-linker from Sigma Aldrich). The neat x-PEGDA surface (without any fluorodecyl POSS) is hydrophilic and oleophilic ($\theta_{water}$=0° and $\theta_{oil}$=10°). A second low surface energy material is used in certain variations, which comprises 1H,1H,2H,2H-Heptadecafluorodecyl Polyhedral Oligomeric SilSequioxane (fluorodecyl POSS, =8 mN/m) is synthesized by the Air Force Research Laboratory (AFRL) as described in Mabry et al., *Angewandte Chemie International Edition* 47, 4137 (2008) and Tuteja et al., *Science* 318, 1618 (2007), each of which is incorporated by reference in its entirety. The rapeseed oil (RSO), ethanol, 1-butanol, 1-octanol, and cyclopentanol are all obtained from Fisher Scientific and are used to demonstrate the efficacy of the separator membranes prepared in accordance with certain variations of the present teachings.

Dip-Coating and Cross-Linking:

Precursor solutions containing the first material PEGDA, DAROCUR 1173™ cross-linker and fluorodecyl POSS are prepared in a solvent of ASAHIKLIN AK225™ commercially available from Structure Probe, Inc. at an overall solute concentration of 50 mg/mL PEGDA:DARCOUR 1173™ is maintained at 9:1 volume:volume ratio. Fluorodecyl POSS concentrations are used at 0 and 20 weight %. To prepare dip-coated porous surfaces, the substrates (cut pieces of stainless steel mesh and ANTICON™ wipes, approximately 2 cm long, approximately 2 cm wide and approximately 1 mm thick) are immersed in the desired solution for 10 min, removed and dried using nitrogen gas at room temperature for 5 min After dip-coating, the surfaces are cross-linked at 254 nm using UVP XX-40S UV bench lamp for 30 min. The dip-coated films cross-link around the cylindrical fiber-like geometry of SS mesh and ANTICON™ wipes, thereby preventing subsequent delamination.

Contact Angle Measurements:

All the contact angle measurements are conducted using a goniometer (commercially available as the Ramé-Hart 200-F1). All the values indicated herein are advancing contact angles that are measured by advancing a small volume of liquid (about 5 µL) onto the surface using a 2 mL micrometer syringe (Gilmont). At least three measurements are performed on each substrate. Typical error in measurements is ±2°.

Exemplary superoleophobic, yet superhydrophilic surfaces prepared in accordance with this example are studied as follows. FIGS. 2a and 2b show a comparative example of a stainless steel mesh and ANTICON™ polyester fabric wipes dip-coated with neat x-PEGDA prepared in the same manner as described above (without the second fluorodecyl POSS material). The wetting behavior of water (blue, γ=72.1 mN/m) and rapeseed oil (red, $\gamma_{lv}$=35.7 mN/m) on stainless steel mesh (D*=2.2) and ANTICON™ wipes (D*=6) dip-coated with neat x-PEGDA can be seen in FIGS. 2a and 2b. Water hydrogen bonds with x-PEGDA and thus readily wets the surface leading to apparent contact angles $\theta^*_{water}$=0° (because $A^*_{water}$=0). On the other hand, in the comparative example, x-PEGDA possesses a very high surface energy ($\gamma_{sv}$=70 mN/m), so that rapeseed oil also readily wets the surface of the x-PEGDA coated stainless steel mesh and ANTICON™ wipes. FIGS. 2c and 2d are treated as described above having both x-PEGDA and fluorodecyl POSS so that the treated surface regions are both superhydrophilic and superoleophobic.

FIGS. 2c and 2d show droplets of water and rapeseed oil on stainless steel mesh and ANTICON™ polyester fabric wipe surfaces coated with x-PEGDA and 20 weight % fluorodecyl POSS. The addition of fluorodecyl POSS leads to a rapid reduction in the overall surface energy of the substrate (estimated $\gamma_{sv}$=10 mN/m). The combination of this low surface energy and the re-entrant curvature yields $A^*_{oil}$=8.5 and 4.3 for SS mesh and ANTICON™ wipes respectively. This allows the surface to form a composite interface with a contacting oil droplet, yielding extremely high apparent contact angles, $\theta^*_{oil}$=122° and 145° for SS mesh and ANTICON™ wipes respectively. Since ANTICON™ polyester fabric possesses a higher D* compared to the stainless steel mesh, the observed apparent contact angles $\theta^*_{oil}$ on the dip-coated ANTICON™ wipes are higher than those on the stainless steel mesh. However, as water can still hydrogen bond with the x-PEGDA present on the substrate, water readily wets both the fabric and mesh surface yielding apparent contact angle $\theta^*_{water}$=0°. In this manner, the properties of such a surface can be preselected by tuning the design parameters, to generate inventive oleophobic, yet superhydrophilic surfaces. Further, the level of oleophobicity can be further tuned by choosing geometries with higher D* where $A^*_{oil}$>1, for example.

Example B

The following materials are coated onto a surface of a porous substrate and the surface energies and contact angles measured. Poly(ethylene glycol) diacrylate (PEGDA) with a number average molecular weight $M_n$ of about 700 Da and its cross-linker, 2-hydroxy-2-methyl propiophenone (DA- ROCUR™ 1173) are obtained from Sigma Aldrich. Poly (methyl methacrylate) (PMMA) of weight average molecular weight $M_w$~35,000 Da is obtained from Scientific Polymer Products, Inc. TECNOFLON™ BR9151 fluoroelastomer is obtained from Solvay Solexis. DESMOPAN™ 9374 polyurethane is obtained from Bayer Material Science. 1H,1H,2H,2H-Heptadecafluorodecyl Polyhedral Oligomeric SilSequioxane (fluorodecyl POSS) is synthesized as described above. ASAHIKLIN™ AK-225 solvent is obtained from Structure Probe, Inc. Rapeseed oil, hexadecane, tetrahydrofuran (THF), methylene blue (blue dye), oil red-o (red dye), sodium dodecyl sulfate (SDS), POLYSORBATE™ 80 surfactant (PS80), and glass slides, are obtained from Fisher Scientific. Stainless steel meshes of mesh size 100 (R=56.5 μm, 2D=138 μm, D*=2.2), 400 (R=12.5 μm, 2D=37.5 μm, D*=2.5), and 500 (R=10.2 μm, 2D=30.5 μm, D*=2.5) are obtained from McMaster Carr. The fabric ANTICON™ 100 wipe ($R_{bundle}$=150 μm, $2D_{bundle}$=300 μm, $R_{fiber}$=5 μm, $2D_{fiber}$=20 μm, D*=6) is obtained from VWR. Silicon wafers are obtained from the clean room at the University of Michigan.

Dip-Coating, Spin-Coating, and Cross-Linking of Synthesized Coatings.

Solutions containing PEGDA, DAROCUR™1173 cross-linker and fluorodecyl POSS are prepared in ASAHIKLIN™ AK-225 solvent at an overall solute concentration of 100 mg/mL The PEGDA:DAROCUR™1173 cross-linker ratio is maintained at 95:5 wt:wt. Fluorodecyl POSS concentrations are prepared at 0, 0.5, 1, 2, 5, 10, 15, and 20 weight %. Solutions containing PMMA are prepared in ASAHIKLIN™ AK-225 solvent at an overall solute concentration of 50 mg/mL Solutions of PMMA with 40 weight % fluorodecyl POSS and TECNOFLON™ fluoroelastomer with 50 weight % fluorodecyl POSS are prepared in ASAHIKLIN™ AK-225 solvent at an overall solute concentration of 10 mg/mL Solutions containing DESMOPAN™ polyurethane are prepared in THF at an overall solute concentration of 10 mg/mL As part of the dip-coating process, small pieces of mesh and fabric (2 cm long and 2 cm wide) are immersed in the desired solution for 10 min, and dried after removal using nitrogen gas at room temperature for 5 min. To prepare spin-coated (non-textured) surfaces, the substrates (silicon wafers, 2 cm long by 2 cm wide, and glass slides, 2 cm long by 3 cm wide) are pre-cleaned with ASAHIKLIN™ AK-225 solvent and spin-coated using Specialty Coating Systems SPINCOATER G3P-8™ spin coating device for 30 seconds at 250-2,000 RPM. After dip-coating or spin-coating, the PEGDA containing surfaces are cross-linked for 5 minutes using UVP XX-40S™ UV bench lamp (λ=254 nm). The dip-coated films cross-link around the cylindrical fiber-like geometry of the mesh and the fabric, thereby preventing subsequent delamination. The mesh and fabric pore diameters 2D remained unaffected after dip-coating.

Table 1 includes a variety of surfaces prepared according to these techniques. The measured advancing contact angles of rapeseed oil and water, as well as, the estimated dispersive component ($\gamma_{sv}^d$), polar component ($\gamma_{sv}^p$) and, the total surface energy ($\gamma_{sv}$) for the different materials are determined, as summarized and further discussed below.

TABLE 1

| Prepared Solid Surface | $\theta_{adv}$ (rapeseed oil) | $\theta_{adv}$ (water) | $\gamma_{sv}^d$ (mN/m) | $\gamma_{sv}^p$ (mN/m) | $\gamma_{sv}$ (mN/m) |
|---|---|---|---|---|---|
| x-PEGDA | 10° | 0° | 35.2 | 39.5 | 74.7 |
| 0.5 wt. % fluorodecyl POSS and x-PEGDA | 20° | 15° | 33.6 | 38.4 | 72.0 |
| 1 wt. % fluorodecyl POSS and x-PEGDA | 35° | 23° | 29.5 | 38.4 | 67.9 |
| 2 wt. % fluorodecyl POSS and x-PEGDA | 56° | 35° | 21.7 | 38.3 | 60.0 |
| 5 wt. % fluorodecyl POSS and x-PEGDA | 88° | 75° | 9.6 | 19.1 | 28.7 |
| 10 wt. % fluorodecyl POSS and x-PEGDA | 88° | 96° | 9.6 | 6.4 | 16.0 |
| 15 wt. % fluorodecyl POSS and x-PEGDA | 88° | 110° | 9.6 | 1.8 | 11.4 |
| 20 wt. % fluorodecyl POSS and x-PEGDA | 88° | 115° | 9.6 | 0.9 | 10.5 |
| PMMA | 23° | 70° | 32.9 | 9.5 | 42.4 |
| 40 wt. % fluorodecyl POSS and PMMA | 88° | 118° | 9.6 | 0.5 | 10.1 |
| DESMOPAN™ polyurethane | 20° | 89° | 33.6 | 2.0 | 35.6 |
| 50 wt. % fluorodecyl POSS and TECNOFLON™ fluoroelastomer | 88° | 120° | 9.6 | 0.3 | 9.9 |

FIGS. 6a-6d show the wetting behavior of water (dyed blue; $\gamma_{lv}$=72.1 mN/m) and rapeseed oil (dyed red; $\gamma_{lv}$=35.7 mN/m) on a stainless steel mesh 100 (inset FIG. 6c; $D^*_{mesh}$=2.2; the mesh number refers to the number of openings per inch) and polyester fabric (inset FIG. 6d; $D^*_{fabric}$=6). Both the membranes are dip-coated with x-PEGDA (cross-linked polyethylene glycol diacrylate). As discussed above, PEGDA is desirably cross-linked because it could otherwise dissolve when contacted with water. Water can hydrogen bond with x-PEGDA and thus it readily permeates through the membrane. Further, as x-PEGDA possesses a very high surface energy ($\gamma_{sv}$=74.7 mN/m; FIG. 7d), Young's contact angle for rapeseed oil on the surface is $\theta_{oil}$=10°. This yields $A^*_{oil}$=0.3 and $A^*_{oil}$=0.1 for mesh 100 and the fabric membranes, respectively. Consequently, both membranes easily allow oil to permeate through, and display apparent contact angles $\theta^*_{oil}$=0°, as shown in FIGS. 6a and 6b.

Addition of fluorodecyl POSS molecules leads to a rapid reduction in the overall surface energy of fluorodecyl POSS and x-PEGDA blends (see FIG. 7d). For a 20 weight % fluorodecyl POSS and 80% x-PEGDA blend ($\gamma_{sv}$=10.5 mN/m), the Young's contact angle of rapeseed oil increases to $\theta_{oil}$=88°. This yields $A^*\gg1$ with rapeseed oil for both the mesh 100 ($A^*_{oil}$=8.6) and the fabric ($A^*_{oil}$=4.3) membranes. As a consequence, both these membranes prevent the permeation of rapeseed oil. As $D^*_{fabric}$ (6)>$D^*_{mesh}$ (2.2), the observed apparent contact angle on the dip-coated fabric ($\theta^*_{oil}$=152°; FIG. 6c) is higher than that on mesh 100 ($\theta^*_{oil}$=125°; FIG. 6d). However, in spite of their low surface energy, water readily permeates through both the fabric and mesh membranes, and yields apparent contact angles $\theta^*_{water}$=0° (FIGS. 6c and 6d). This surprising observation appears to be a direct consequence of the surface reconfiguration induced by the contacting water droplet, as discussed below.

FIGS. 6e-6g show AFM phase images, in air, of x-PEGDA and its blends with fluorodecyl POSS. While crystalline domains are absent on the neat x-PEGDA surface (FIG. 6e), the surfaces of both 10 weight % and 20 weight % fluorodecyl POSS (FIGS. 6f and 6g) blends are completely covered with crystalline domains of fluorodecyl POSS. This indicates significant surface segregation of the fluorodecyl POSS molecules, as may be expected due to their extremely low surface energy.

A minimum amount of fluorodecyl POSS to be applied to cover a surface (comprising PEGDA) to form a film having a thickness of about 200 nm is estimated as follows. Where a solid is a blend of two or more components, the component with the lowest surface energy tends to migrate to the surface in order to decrease the overall free energy of the system. In determining an amount of fluorodecyl POSS for completely covering the surface of an x-PEGDA film, complete surface migration of fluorodecyl POSS domains is assumed.

FIG. 8 shows a schematic of a film 200 comprising a blend comprising a first material (x-PEGDA) 204 and a second material (fluorodecyl POSS) 202 formed over a substrate (not shown). The film 200 has a length (a), width (b), and thickness (t). An individual fluorodecyl POSS 202 domain is designated "d." A surface area of the film is length (a) times width (b) or ab and the volume of the film is abt. Assuming a hexagonal close packing, e.g., packing fraction of $\pi/2\sqrt{3}$, the number of fluorodecyl POSS domains (N) of diameter d required to completely cover the surface area of the films is given by:

$$N = (\pi/2\sqrt{3})\left(\frac{ab}{\pi d^2/4}\right) = \frac{2ab}{\sqrt{3}\, d^2}.$$

A volume fraction ($v_{FPOSS}$) of the fluorodecyl POSS domains required to completely cover the surface of the film is:

$$v_{FPOSS} = \frac{N(\pi d^3/6)}{abt} = \frac{\pi d}{3\sqrt{3}\, t}.$$

Using this, a corresponding weight fraction $w_{FPOSS}$ of the fluorodecyl POSS domains can be found by:

$$w_{FPOSS} = \frac{\rho_{FPOSS}(\pi d/3\sqrt{3}\, t)}{\rho_{FPOSS}(\pi d/3\sqrt{3}\, t) + \rho_{PEGDA}(1 - (\pi d/3\sqrt{3}\, t))}.$$

Here, $\rho_{FPOSS}=2.07$ g/cc (1) and $\rho_{PEGDA}=1.12$ g/cc are the densities of fluorodecyl POSS and PEGDA, respectively. Using AFM, a thickness of about t=200 nm is estimated. Assuming d=4 nm, the weight fraction $w_{FPOSS}$ of fluorodecyl POSS domains required to fully cover the surface of the film is 0.022 or about 2.2 weight %. In this context, this is a lower limit of weight fraction $w_{FPOSS}$ needed to cover the surface for two reasons. First, it appears that fluorodecyl POSS molecules actually crystallize into domains that are significantly larger than 4 nm, as found by analysis of AFM phase images (see FIGS. 6f and 6g). Second, not all fluorodecyl POSS molecules migrate to the surface (polymer-air interface) of the PEGDA film as theoretically assumed.

FIGS. 7a and 7b show optical images, in air and under water, respectively, of surfaces spin-coated with 20 weight % fluorodecyl POSS and x-PEGDA blends. In air, the surface is relatively rough with several fluorodecyl POSS aggregates. However, under water, fluorodecyl POSS aggregates disappear to reveal a smoother surface (with a few wrinkles) that is indicative of surface reconfiguration. PEGDA chains appear to reconfigure to increase their interfacial area with water and are believed to facilitate enthalpic gains through hydrogen bonding. Surface reconfiguration is further confirmed by the absence of large crystalline domains in the in-situ, under water AFM phase image (FIG. 7c). Multiple water wetting-drying test cycles find that this surface reconfiguration is reversible.

FIG. 7d shows the surface energy of fluorodecyl POSS and x-PEGDA blends determined using the Owens-Wendt analysis. Solid surface energy can be estimated based on the following. The equilibrium configuration of a liquid drop on a smooth solid surface is given by the Young's equation as:

$$\gamma_{lv} \cos\theta = \gamma_{sv} - \gamma_{sl}.$$

Of the four parameters, the liquid surface tension $\gamma_{lv}$ and the equilibrium contact angle $\theta$ are readily measurable. In order to determine both the solid surface energy $\gamma_{sv}$ and the solid-liquid interfacial energy $\gamma_{sl}$, another relationship between $\gamma_{sv}$ and $\gamma_{sl}$ is used. Typically, this additional relationship is obtained from an equation of state approach or a surface energy component approach.

Here, the surface energy component approach described by Owens and Wendt is used to estimate $\gamma_{sv}$. According to this approach, the solid surface energy is the sum of contributions from two types of intermolecular forces at the surface:

$$\gamma_{sv} = \gamma_{sv}^d + \gamma_{sv}^p.$$

$\gamma_{sv}^d$ is the component that accounts for the dispersive forces, while $\gamma_{sv}^p$ is the component that accounts for the polar forces, such as hydrogen bonding. Further, this approach postulates that:

$$\gamma_{sl} = \gamma_{sv} + \gamma_{lv} - 2\sqrt{\gamma_{sv}^d \gamma_{lv}^d} - 2\sqrt{\gamma_{sv}^p \gamma_{lv}^p}.$$

Here, $\gamma_{lv}^d$ and $\gamma_{lv}^p$ are the dispersive and polar components of the liquid surface tension, respectively. Combining these equations and recognizing that the polar component of liquid surface tension is zero ($\gamma_{lv}^p=0$) for non-polar liquids such as oils, the dispersive component of solid surface energy is given as:

$$\gamma_{sv}^d = \gamma_{lv}\left(\frac{1+\cos\theta}{2}\right)^2.$$

where $\gamma_{lv}$ is the surface tension of a non-polar liquid and $\theta$ is the equilibrium contact angle of the same non-polar liquid on the solid surface. Rapeseed oil ($\gamma_{lv}=35.7$ mN/m) is used as the non-polar liquid to estimate $\gamma_{sv}^d$. After determining the dispersive component $\gamma_{sv}^d$, combining these equations for a polar liquid ($\gamma_{lv}^p \neq 0$), the polar component of the solid surface energy is given as:

$$\gamma_{sv}^p = \frac{1}{\gamma_{lv}^p}\left[\frac{\gamma_{lv}(1+\cos\theta)}{2} - \sqrt{\gamma_{sv}^d \gamma_{lv}^d}\right]^2.$$

where $\gamma_{lv}$ is the surface tension of a polar liquid and $\theta$ is the equilibrium contact angle for the same polar liquid on the solid surface. Water ($\gamma_{lv}^d=21.1$ mN/m and $\gamma_{lv}^p=51.0$ mN/m) is used as the polar liquid to estimate $\gamma_{sv}^p$. As noted above, Table 1 summarizes the solid surface energy values estimated by this approach using spin-coated flat substrates. Note that for all surfaces containing x-PEGDA, the contact angles of water reported are the instantaneous values observed when water first contacts the solid surface. These values are used to estimate $\gamma_{sv}^p$.

Due to surface reconfiguration, water contact angle decreases to 0° within a short period of time on fluorodecyl POSS and x-PEGDA coated surfaces. As a result, for blends of x-PEGDA and fluorodecyl POSS, $\gamma_{sv}^P$ and $\gamma_{sv}$ change with time. Addition of fluorodecyl POSS causes a reduction in both the dispersive ($\gamma_{sv}^d$) and polar ($\gamma_{sv}^P$) components of surface energy. This is likely due to a reduction in the interfacial area between PEGDA chains and the contacting water droplet with increasing fluorodecyl POSS concentration. This conclusion is corroborated by the increased time of wetting (ToW) for water on spin-coated fluorodecyl POSS and x-PEGDA blends (FIG. 7e). ToW is defined as the time required for the water contact angle on a surface to decrease from its initial value and reach 0°. ToW is measured for water on the porous mesh 100 and fabric membranes (FIG. 7f). On these surfaces, ToW is defined as the time required for the water droplet to imbibe into the membrane.

Membrane imbibition is not typically instantaneous for surfaces with reconfigurable chemistry, such as certain variations prepared in accordance with the present disclosure. In this case, the water-air interface progressively penetrates into the surface texture over the total ToW. This is believed to be because for any membrane, if the liquid does not permeate through its pores, the solid-liquid-air composite interface equilibrates at a location on the membrane where the local texture angle ($\psi$) is equal to the Young's contact angle $\theta$. As can be observed from the insets in FIG. 7e, $\theta_{water}$ decreases with time as a consequence of surface reconfiguration. For cylindrical features (here both meshes and fabrics), the local texture angle varies along their curvature from $\psi_{max}=180°$ at the top of the cylinders to $\psi_{min}=0°$ at the bottom. Thus, during imbibition, the water-air interface progresses downward along the curvature of the cylindrical features in order to match the Young's contact angle.

Finally water permeates through the membrane once the robustness factor $A^* \leq 1$. From Equation 2 discussed previously, for mesh 100, $A^*=1$ when $\theta_{water}=18°$. ToW measurements on dip-coated mesh membranes match closely with the time required for $\theta_{water}$ to decrease from its initial value to 18° (FIG. 7f). However, ToW for water on the dip-coated fabrics is found to be significantly higher. This is because water has to progressively wet multiple fibers during imbibition.

A contact angle of rapeseed oil on a reversible stimuli-responsive surface is likewise demonstrated as follows. FIG. 9a shows drops of rapeseed oil (dyed red) at three different locations on a substrate spin-coated with a 20 weight % fluorodecyl POSS and x-PEGDA blend. At an as-prepared and dry location designated by region (i), rapeseed oil shows a contact angle of $\theta_{oil}=88°$ because a majority of the surface is covered with fluorodecyl POSS domains. At a location wet by water (ii), the contact angle of rapeseed oil is significantly lower ($\theta_{oil}=45°$), indicating that the surface has reconfigured to expose the PEGDA chains. Surface energy analysis of the wet surface suggests that it is equivalent to an x-PEGDA blend with approximately 0.4-1.5 weight % fluorodecyl POSS. At a location that was previously wet by water and subsequently dried completely (iii), rapeseed oil once again shows a contact angle of $\theta_{oil}=88°$, indicating that the surface has reverted back to its original configuration, in other words fluorodecyl POSS domains cover the majority of the surface once again. This shows a reversible stimuli-responsive surface reconfiguration similar to a so-called "flip-flop" mechanism. After multiple water wetting-drying cycles, it is found the rapeseed oil contact angle at a fixed location cycles between $\theta_{oil}\sim 88°$ (dry) and $\theta_{oil}\sim 45°$, as shown in FIG. 9b.

Various fabrics have interwoven bundles of fibers (FIG. 10a). Each bundle contains several layers of smaller individual fibers that offer an additional length scale for air entrapment as shown in FIG. 10b. For water on an individual fiber, $R_{fiber}=5$ µm, $2D_{fiber}=20$ µm, $A^*=1$ when $\theta_{water}=7°$. Thus, the time of wetting (ToW) for water on each layer of the fibers should be the equal to the time taken for $\theta_{water}$ to reach 7°, which is approximately equal to the ToW for water on spin-coated substrates. Assuming N-layers of individual fibers, the ToW for water on the fabric surface is estimated to be N times the ToW for water on the spin-coated surface. Fitting the experimental data with this N-layer model yields a best fit for N=9, which appears to be a reasonable estimate, as shown in FIG. 10a.

Example C

Application for Oil-Water Separation from a Free Oil Mixture

FIGS. 3a-3c shows a simple oil-water separation apparatus that includes a porous material prepared in accordance with certain aspects of the present teachings used as a separator membrane. The porous material is prepared in accordance with the techniques described in Example A above and has a stainless steel mesh coated with 20 weight % fluorodecyl POSS and a balance cross-linked x-PEGDA sandwiched as a membrane between two vertical glass tubes. 1.2 mL of water is added above the stainless steel mesh (FIG. 3a) at time=0 seconds, immediately followed by 1.2 mL of RSO (FIG. 3b shows elapsed time of about 30 seconds). After one minute (approximately 60 seconds), all of the water passes through the mesh material as a filtrate, while all of the oil is retained above the mesh membrane material, as shown in FIG. 3c. As can be seen in FIG. 3c, water wets the superhydrophilic stainless steel mesh surface and trickles down into the bottom tube, while rapeseed oil remains above the superoleophobic stainless steel mesh. After 24 hours of elapsed time, the oil still does not permeate through the steel mesh membrane having the superhydrophilic and superoleophobic surface.

Example D

Application for Oil-Water Separation from an Emulsion

FIGS. 4a-4c show a simple oil-water separation apparatus like that in Example C, which also includes a porous material used as a separator membrane prepared in accordance with the techniques of Example A above. Thus, a filter paper is coated with x-PEGDA and 20 weight % fluorodecyl POSS and is sandwiched as a membrane between two vertical glass tubes. An oil-in-water emulsion is prepared from 30 vol. % rapeseed oil (dyed red), 70 vol. % water (dyed blue), and a sodium dodecyl sulfate surfactant (SDS) at a concentration of about 0.3 mg/ml. 5 mL of the emulsion is added above the filter paper membrane having the superhydrophilic and superoleophobic surface (FIG. 4a) to separate water and oil phases from the emulsion.

Multiple filtration steps can optionally be used to separate the emulsion in this example. FIG. 4a shows the filtrate after the first filtration step of the emulsion, where an oil-rich phase remains on the top and a water-rich phase of filtrate passes through the membrane material. The water-rich phase after the first filtration step has less than 10% oil, thus separating over 90% of the oil phase from the emulsion. In a subsequent optional step, this water-rich filtrate can be passed through a different separator membrane with a smaller pore size, as shown in FIG. 4b. After the second filtration step, the water-phase filtrate has less than 0.1% oil, resulting in 99.9% separation of oil and water from an emulsion stabilized by an SDS surfactant.

Therefore, in accordance with the present teachings, a new process is provided that permits use of gravitational forces, capillary forces, and hydrogen bonding interactions to effectively separate oil from water. Such a separation is effective for free oil and water liquid-liquid mixtures. In certain aspects, the present disclosure also includes use of such a simplified separation technique for emulsions (oil-in-water emulsions, for example), by selecting a porous substrate having a larger D* so that higher volumes can be handled by using membranes with a larger area. Thus, the present disclosure provides separations techniques that are effective for emulsified liquid-liquid mixtures.

In certain embodiments, a conventional membrane separation device can incorporate the inventive porous materials as a separator membrane in a single stage separator or as one portion of a multiple stage separator. Membrane-based separation technologies are particularly well suited to handle separations of a wide range of industrial effluents because of their lower energy costs, particularly for handling emulsions, as will be described in greater detail below. Further, multiple distinct porous membrane materials prepared in accordance with the present disclosure may be employed in series with one another, in different stages of a multi-stage separator device, and optionally used in conjunction with other conventional separator materials. Various embodiments include a porous material exhibiting the superhydrophilic and oleophobic surface having a first apparent advancing dynamic contact angle of less than or equal to about 1° for water and a second apparent advancing dynamic contact angle of greater than or equal to about 90° for a preselected oil or combinations of oils (represented by exemplary rapeseed oil). In certain embodiments, a porous material exhibits a superhydrophilic and superoleophobic surface having a first apparent advancing dynamic contact angle of less than or equal to about 1° for water and a second apparent advancing dynamic contact angle of greater than or equal to about 150° for a for a preselected oil or combinations of oils (represented by exemplary rapeseed oil). In certain aspects, particularly preferred embodiments employ a porous separator concurrently exhibiting such superhydrophilicity and superoleophobicity at the surface formed by a cross-linked material made by combining a hydrophilic polymer comprising poly(ethylene glycol) diacrylate (PEDGA), a low surface energy material comprising 1H,1H,2H,2H-heptadecafluorodecyl polyhedral oligomeric silsequioxane (F-POSS), and a cross-linker comprising 2-hydroxy-2-methyl propiophenone (DAROCUR™ 1173).

As discussed above, conventional membrane separation of oil-water emulsions relies on size exclusion, the viscosity difference between immiscible phases, or the coalescence of the emulsified phase. In accordance with certain principles of the present disclosure, a method is provided for preferential wetting of one phase as the major driving force to separate emulsions inducing separation by the difference in capillary forces acting on the individual phases, which is referred to herein as Capillary Force Driven Separation or "CFDS" for brevity. In certain variations of CFDS, a wetting phase permeates through the separator membrane, while the non-wetting phase is retained above the separator membrane. As discussed above, a breakthrough pressure required to force the non-wetting phase through a membrane (already saturated by the wetting phase) can be determined by:

$$P_{breakthrough} = \frac{2R\gamma_{12}}{D^2} \frac{(1-\cos\theta')}{(1+2(R/D)\sin\theta')},$$

where $\gamma_{12}$ is the interfacial tension between the wetting phase and the non-wetting phase and $\theta'$ is the contact angle of the non-wetting phase on the solid surface, both of which are completely immersed in the wetting phase. When applied pressure is less than breakthrough pressure ($P_{applied} < P_{breakthrough}$), only the wetting phase permeates through the membrane.

CFDS provides the ability to form a very high quality permeate as the non-wetting phase is substantially entirely retained on or above the membrane. Further, the inherent self-repairing nature of CFDS renders the permeate quality more resistant to pressure perturbations. Third, CFDS is a single unit operation unlike most conventional techniques used for emulsion separation. To enhance effectiveness of a CFDS-based system, a wetting phase should optimally come into contact with the membrane. Facilitating contact of a wetting phase with the separator membrane can be achieved by: gravity-assisted feeding (in circumstances where the wetting phase has a higher density than the non-wetting phase), electrostatic force (if the wetting phase is a polar liquid), forced convection, and the like.

In various aspects, the present disclosure provides methods and apparatuses for continuously filtering a first component from a liquid-liquid mixture. A method of separating a liquid-liquid mixture comprises contacting a liquid-liquid mixture with a superhydrophilic and oleophobic surface of a porous separator material. In certain preferred aspects, the method of separating a liquid-liquid mixture comprises contacting a liquid-liquid mixture with a superhydrophilic and superoleophobic surface of a porous separator material. The liquid-liquid mixture comprises a first component present at an initial amount and a second component. The contacting facilitates passage of the first component through the porous separator material, so that the contacting separates greater than or equal to about 85 weight % up to about 100 weight % of the initial amount of the first component from the liquid-liquid mixture, so that the balance that remains above the porous separator is primarily the second component. In certain aspects, the porous separator material is a first porous separator and the method further comprises contacting the liquid-liquid mixture with a second porous separator material that is hydrophobic and oleophilic to facilitate passage of the second component therethrough, so that the contacting separates greater than or equal to about 85 weight % of the initial amount of the second component from the liquid-liquid mixture.

Such continuous methods of separation can be conducted in various separator devices. For example, in certain variations, the liquid-liquid mixture is gravity-assisted or gravity fed towards the superhydrophilic and oleophobic surface of the first porous separator material to continuously separate the first component from the liquid-liquid mixture. A second porous separator can be configured to continuously remove the second component from a region where the second component concentrates (above the superhydrophilic and oleophobic surface) to continuously remove the second component, as well. As such, the first component is efficiently and continuously separated from a concentrated second component.

In yet other variations, as will be described in greater detail below, a separator system for continuous separation may comprise at least two parallel separator devices each respectively comprising a porous separator material having a superhydrophilic and oleophobic surface, where the liquid-liquid mixture is gravity fed or gravity-assisted for the continuous separating processes. Such parallel separator devices may respectively further comprise a second separator membrane to continuously remove the second component.

In one embodiment of a simplified, exemplary separator apparatus prepared in accordance with certain principles of the present disclosure, a gravity-assisted capillary force driven separation (CFDS) apparatus is provided. A schematic illustration of an exemplary apparatus for separating emulsions is provided in FIG. 11. In the embodiment shown, a first membrane is employed that is prepared in accordance with certain aspects of the present teachings to be hydrophilic and oleophobic so as to continuous separate a first hydrophilic component from a liquid-liquid mixture, as where a second membrane is hydrophobic and oleophilic to continuously separate a second oleophilic component from the liquid-liquid mixture.

FIG. 11 shows one embodiment of a separation apparatus 99. Separation apparatus 99 feeds an emulsion 100 from a tube or conduit 101 via a syringe pump 102 into a feeding chamber 104 at a constant rate. A first water-rich permeate 106 passes through a hydrophilic (or superhydrophilic) and oleophobic membrane 108 (disposed in a bottom opening 110 of the chamber 104) prepared in accordance with the present teachings. Concurrently, a second hexadecane-rich permeate 114 passes through a second hydrophobic and oleophilic membrane 116 disposed in a second side opening 118 in a sidewall 120 of the feeding chamber 104. In this manner, a high purity water-rich permeate 106 is collected in a first collection chamber 122 which is in fluid communication with the bottom opening 110 of feeding chamber 104 and a high purity hexadecane-rich permeate 114 is collected in a second collection chamber 124 in fluid communication with the second side opening 118 in the sidewall 120 of feeding chamber 104.

For example, in certain embodiments, an exemplary emulsion 100 is a water-in-hexadecane emulsion. The water-in hexadecane is fed continuously via a syringe pump into the feeding chamber 104. Water 106 is separated by from the hexadecane 114 by passing through the hydrophilic and oleophobic membrane 108. The hexadecane increases in concentration in a region above the hydrophilic and oleophobic membrane 108 and is diverted through the second membrane 116 that is hydrophobic and oleophilic. In this manner, separation device 99 permits separation of water and hexadecane from an emulsion, where water 106 is collected in the first collection chamber 122 at a purity of greater than or equal to about 99.9%. Likewise, hexadecane 114 is collected in the second collection chamber 124 at a concentration of greater than or equal to about 99.9%. Thus, by using gravity-assisted CFDS, a single stage separation of a water-in-oil or an oil-in-water emulsion is successfully achieved at high purity levels.

FIG. 19 shows a schematic of an alternative embodiment of an exemplary separation apparatus for gravity-assisted capillary force driven separation (CFDS) to continuously separate emulsions. In FIG. 19, a water-rich permeate 106 and an oil rich permeate 114 are separated from an emulsion 100 and collected in parallel (side-by-side) collectors. To the extent that the features are common to those in FIG. 11, they share the same references numerals. For brevity, only the new features in FIG. 19 that deviate from the design of FIG. 11 will be discussed herein. Separation apparatus 99A feeds emulsion 100 (e.g., water-in-hexadecane emulsion) from conduit 101 via a syringe pump 102 into a feeding chamber 104A at a constant rate. Two distinct openings 110A and 110B are provided along the bottom of the feeding chamber 104A, in which two distinct separation membranes 108A and 116A are disposed. The first separation membrane 108A is hydrophilic (or superhydrophilic) and oleophobic. The second separation membrane 116A is hydrophobic and oleophilic. Thus, the first separation membrane 108A permits water-rich permeate 106 to pass, while the second separation membrane 116A permits hexadecane-rich permeate 114 to pass. An inverted "y" shape is formed by two separate conduits 130, 132 by establishing fluid communication between the feeding chamber 104A and the first collection chamber 122A or the second collection chamber 124A. Thus, the water-rich permeate 106 passes through the first separation membrane 108A along conduit 130 and is collected in first collection chamber 122A, while the hexadecane-rich permeate 114 passes through the second separation membrane 116A and second conduit 132, where it is collected in second collection chamber 124A. As in the embodiment of FIG. 11, the parallel separator systems provide separation of water and hexadecane from an emulsion, where water 106 can be collected at a concentration of greater than or equal to about 99.9% and hexadecane 114 likewise collected at a concentration of greater than or equal to about 99.9%.

FIG. 20 shows yet another embodiment of a simplified schematic of an exemplary separation apparatus for gravity-assisted capillary force driven separation (CFDS) to continuously separate emulsions. In FIG. 20, the water-rich permeate 106 and the oil rich permeate 114 are separated from emulsion 100 and collected in parallel (side-by-side) collectors. Again to the extent that the features are common to those in FIG. 11 or 19, they share the same references numerals and will not be explicitly discussed herein. Separation apparatus 99B feeds emulsion 100 (e.g., water-in-hexadecane emulsion) via a syringe pump 102 into a feeding chamber 104B at a constant rate. A first opening 140 is disposed in sidewall 120A on a first side of feeding chamber 104B. A first separation membrane 108B is hydrophilic (or superhydrophilic) and oleophobic and disposed in the first opening 140. A second opening 142 is disposed in a sidewall 120B on a second side of the feeding chamber 104B opposite to the first side (sidewall 120A). The second separation membrane 116B is hydrophobic and oleophilic. Thus, the first separation membrane 108B permits water-rich permeate 106 to pass, while the second separation membrane 116B permits hexadecane-rich permeate 114 to pass. Two separate lateral conduits 144, 146 establish fluid communication between the feeding chamber 104B and the first collection chamber 122B or the second collection chamber 124B. Thus, the water-rich permeate 106 passes through the first separation membrane 108B through the first lateral fluid conduit 144 and is collected in first collection chamber 122A, while the oil-rich permeate 114 passes through the second lateral conduit 146 and is collected in second collection chamber 124B. As in the embodiment of FIGS. 11 and 19, the parallel separator systems provide separation of water and oil from an emulsion, where water 106 can be collected at a concentration of greater than or equal to about 99.9% and hexadecane 114 likewise collected at a concentration of greater than or equal to about 99.9%.

It should be noted that separation devices may incorporate other conventional components or have various other configurations and are not limited exclusively to the exemplary designs discussed above, as appreciated by those of skill in the art. By way of further example, in certain variations, a continuous oil-water separation apparatus can incorporate multiple (two or more) CFDS-based unit operations that are parallel or in series with one another for continuous separation processes.

Example E

Exemplary bench-scale experimental set-up of gravity-fed separations devices are shown in FIGS. 12a-12b and 13a for separating a mixture of immiscible aqueous and oil phases. In FIGS. 12-12b, a feeding conduit or feeding chamber (an upper tube) is situated above a membrane prepared in accordance with the principles described above. More specifically, FIGS. 12a and 12b show gravity-assisted CFDS separation of a sodium dodecyl sulfate stabilized hexadecane-in-water emulsion.

This emulsion in the upper tube is a hexadecane-in-water emulsion (50 vol. % hexadecane) stabilized with a sodium dodecyl sulfate (SDS; HLB=40) surfactant. The 50:50 v:v hexadecane-in-water emulsion ($\rho$=0.88 g/cc) is prepared by stirring water and oil at 1,200 RPM with 0.5 mg of SDS/mL of emulsion, respectively. To determine whether the emulsion is hexadecane-in-water or water-in-hexadecane, electrical resistance is measured with a multimeter.

Hexadecane droplet size distribution shows a wide-range of oil droplet diameters (100 nm<$d_{oil}$<1,000 µm), with the highest number fraction of droplet diameters in the range of 10-20 µm. Size distributions of the dispersed phase in feed emulsions and permeates are determined using two techniques—optical microscopy image analysis for droplets above 1 µm in diameter and dynamic light scattering (DLS) for droplets below 1 µm in diameter.

FIGS. 17a and 17d show representative optical microscopy images of the water-in-hexadecane and hexadecane-in-water feed emulsions, respectively. Using ImageJ, the images were converted to gray scale, the edges of the dispersed droplets were detected and their area distribution is obtained in pixel$^2$ using the "analyze particles" function. The area distribution is converted to number size (diameter) distribution of spherical droplets. The scale bar on the optical microscopy images is used to convert size from pixel to µm. Ten different images with more than 100 drops per image are analyzed to reduce the error in the estimated size distribution. FIGS. 17b and 17e show the number size distributions of the dispersed phase, determined using image analysis, in water-in-hexadecane and hexadecane-in-water feed emulsions, respectively. The average size of dispersed phase in both the feed emulsions is between 10-20 µm. FIGS. 17c and 17f show the number size distributions of the dispersed phase, determined using DLS, in water-in-hexadecane and hexadecane-in-water feed emulsions, respectively. The average size of dispersed phase (for droplets<1 µm) in both the feed emulsions is between 100-200 nm.

FIGS. 18a and 18c show the number size distribution of the permeates obtained from separation of hexadecane-in-water emulsion using separators having substrates formed from either mesh 400 (2D=37.5 µm) or mesh 500 (2D=30.5 µm), respectively. These are determined using image analysis. The average size of the dispersed phase in both permeates is between 10-20 µm. Comparing hexadecane-in-water feed emulsion with the permeates, it is evident that nearly all hexadecane droplets above 40 µm were removed during separation. FIGS. 18b and 18d show the number size distribution of the permeates obtained from the separation of the hexadecane-in-water emulsion using mesh 400 and mesh 500, respectively. These are determined using DLS. The average size of dispersed phase in both the permeates is approximately 100 nm Comparing the hexadecane-in-water feed emulsion with the permeates, it becomes evident that the droplet size distribution below 1 µm remains unchanged during separation.

With renewed reference to the gravity-assisted-assisted capillary force driven separation (CFDS) device in FIGS. 12a and 12b, the separation apparatus includes a separator membrane formed from mesh 400 (2D=37.5 µm) substrate dip-coated with 20 weight % fluorodecyl POSS and x-PEGDA blend sandwiched between two vertical glass tubes. A hexadecane-in-water emulsion is added to the upper tube above the separator membrane (FIG. 12a). A KDScientific KDS-200™ syringe pump is used to deliver the feed emulsion during continuous separation at a flux of 300 L/m$^2$-hr. As soon as water within the emulsion contacts the membrane, the surface starts to reconfigure in order to expose PEGDA chains. Within a few minutes, the water-rich permeate passes through the membrane while the hexadecane-rich retentate is retained above the membrane (FIG. 12b). Oleophobicity of the membrane when it is submerged under water is important for the separation of hexadecane-in-water emulsions. The inset of FIG. 12a shows the contact angle of hexadecane (measured to be 120°) on a surface spin-coated with 20 weight % fluorodecyl POSS and x-PEGDA blend, submerged in water containing dissolved SDS (1 mg/mL).

Thermogravimetric analyses (FIG. 12c) indicate that the permeate composition is approximately 99.9 weight % water, while the retentate composition is approximately 99.9 weight % hexadecane. This high separation efficiency is further confirmed by the following analytical techniques. In addition to using thermogravimetric analysis, the following three techniques are employed to estimate the separation efficiency of the CFDS processes.

Transmittance of an emulsion is a measure of the degree of light scattered by the emulsified droplets. The transmittance of emulsions increases with a decrease in the concentration of the emulsified droplets. Thus, transmittance measurements are taken in order to estimate the permeate (water-rich phase) quality relative to the feed emulsions. FIG. 14a shows the transmittance of hexadecane-in-water and water-in-hexadecane feed emulsions (absorbance normalized to 1), transmittance of the corresponding permeates, and transmittance of pure water between 390 nm and 750 nm (visible spectrum). It is evident that both the feed emulsions are very turbid, while the corresponding permeates are very clear. This demonstrates that the inventive CFDS methods of separation described here lead to nearly complete separation.

Another measurement of the degree of separation obtained using the methods of the present disclosure can be conducted by comparing the density of the permeates with density calibration curves (FIG. 14b). Calibration curves are generated by measuring the densities of hexadecane-in-water and water-in-hexadecane emulsions with different hexadecane compositions (e.g., 0 weight %, 1 weight %, and 2 weight %). Then, the density of the permeates from hexadecane-in-water and water-in-hexadecane emulsions are measured to be 1.004±0.003 g/cc and 1.006±0.004 g/cc, respectively. Comparing them with the calibration curves indicates that the permeates have significantly <1 weight % hexadecane, confirming the separation efficiency for the inventive processes and devices to be >99%.

Karl Fischer analysis is also widely used to estimate water content in various oils. The retentates from the batch separation of water-in-hexadecane and hexadecane-in-water emulsions are determined to contain approximately 0.6 weight % water each. The hexadecane-rich permeate from the continuous separation of water-in-hexadecane emulsion is determined to contain approximately 25 ppm water (i.e., approximately 99.9975 weight % hexadecane), compared to approximately 20 ppm water for the as-obtained hexadecane. The error in measurements is ±3%.

In summary, as shown in FIG. 12c, thermogravimetric analyses indicate that the permeate composition is approximately 99.9 weight % water, while the retentate composition is approximately 99.9 weight % hexadecane. This high separation efficiency is further confirmed by comparing the transmittance of the feed emulsions with that of the permeates, as well as, density measurements. However, Karl Fischer analysis shows that the retentate composition is approximately 99.4 weight % hexadecane. Optical image analysis of the droplet size distribution in the permeate indicates that the membrane removes virtually all hexadecane droplets exceeding 40 µm in diameter. Thus, the CFDS gravity-driven separation of emulsions through such a separation device results in highly pure constituents.

FIGS. 12d and 12e show separation of a mixture of 4 components: water, hexadecane, water-in-hexadecane emulsion, and hexadecane-in-water emulsion. Again, mesh 400 dip-coated with 20 weight % fluorodecyl POSS and x-PEGDA blend separates this mixture into approximately 99.9 weight % water (dyed blue) and into approximately 99.9 weight % hexadecane (dyed red), as confirmed by thermogravimetric analyses (FIG. 12c).

For the separation apparatus shown in FIGS. 12a and 12d, the maximum height of the liquid column before breakthrough ($h_{breakthrough}$) is estimated as described above where $P_{breakthrough} = \rho g h_{breakthrough}$ and $\rho$ is the density of the liquid. For the hexadecane-in-water emulsions, $\theta'_{oil}=120°$ (inset in FIG. 12a) and $\gamma_{12}=4.0$ mN/m. $h_{breakthrough}$ is then predicted to be 2.3 cm. Similarly, $h_{breakthrough}$ for water-in-hexadecane emulsions is predicted to be 2.4 cm. These values closely match experimentally measured values of 2 cm and 2.2 cm for the hexadecane-in-water and water-in-hexadecane emulsions, respectively. For water-in-hexadecane emulsions $h_{breakthrough}$ is limited by the permeation of hexadecane through pores already wet by water. This analysis also shows that almost all the surfactant (SDS) is in the water-rich permeate.

In the design discussed above, oil accumulates above the membrane over time and will eventually breakthrough if operating height exceeds the breakthrough height ($h > h_{breakthrough}$). Further, the retentate quality as obtained using Karl Fischer analysis is only 99.4 weight % hexadecane. Thus, in certain aspects, the present disclosure contemplates a continuous separation apparatus that has multiple parallel membranes, such as in the exemplary apparatuses discussed previously in the context of FIGS. 11, 19, and 20.

A bench-scale experimental apparatus in FIG. 13a utilizes a hydrophilic and oleophobic membrane at a bottom of a CFDS unit along with a hydrophobic and oleophilic membrane disposed in the sidewall (similar to the device of FIG. 11). FIG. 13a shows an image of the apparatus during the separation of a water-in-hexadecane emulsion. The hydrophilic and oleophobic mesh 400 is dip-coated with a 20 weight % fluorodecyl POSS and x-PEGDA blend, while the hydrophobic and oleophilic mesh 400 is dip-coated with DESMOPAN™ 9370 A polyurethane ($\gamma_{sv}=35.6$ mN/m).

During continuous separation, the permeate flows through the hydrophilic and oleophobic membrane at the bottom and has a purity of about 99.9 weight % water (dyed blue), while the permeate that flows through the hydrophobic and oleophilic membrane on the sidewall is about 99.9 weight % hexadecane (dyed red), as confirmed by thermogravimetric analyses (FIG. 13b). Note that approximately 99.9 weight % is the limit of detection for the thermogravimetric analysis used here. Karl Fischer analysis shows that the composition of the permeate through the hydrophobic and oleophilic membrane on the sidewall is about 99.9975 weight % hexadecane. Analysis of the hexadecane-rich permeate indicates that greater than or equal to about 99.8% of water droplets with diameter of less than about 20 µm are removed during separation.

Thus, this provides a new process of continuous, gravity-assisted separation of oil-water emulsions. Fluxes of water-rich and hexadecane-rich permeates through the membranes are measured to be about 90 L/m²-hr and 210 L/m²-hr, respectively. Experimentally, the same flux for water is achieved using both mesh 400 (2D=37.5 µm) and mesh 500 (2D=30.5 µm) porous coated substrates during continuous separations operation. However, a membrane with a smaller pore diameter, such as mesh 500, has a significantly higher value for $P_{breakthrough}$ and is, therefore, more resistant to pressure perturbations.

Further, the fluxes did not decline over a period of 180 minutes (FIG. 13c), indicating that the membranes are highly fouling-resistant. The observed self-cleaning ability of the inventive hydrophilic and oleophobic coatings appears to contribute to the fouling resistant surface properties. The significantly larger pore sizes of the membranes used in this separation, as opposed to the pore sizes used traditionally, likewise enhance fouling-resistance. Furthermore, testing has employed a single separation device apparatus for continuous emulsion separation for over 24 hours, without a change in the flux of either the water-rich or the hexadecane-rich permeates. This observation is in contrast to the flux decline observed for most conventional hydrophobic membranes.

Example F

FIGS. 13a-13b and 15a-15b show similar gravity-assisted CFDS bench-scale separation devices. FIGS. 15a-15b employ a water-in-hexadecane emulsion (30 vol. % water) stabilized with a POLYSORBATE™ 80 surfactant (PS80; HLB=15) surfactant. The separation apparatus comprises a separator material formed from mesh 400 dip-coated with 20 weight % fluorodecyl POSS and x-PEGDA blend sandwiched between two vertical glass tubes. The emulsion is added to the upper tube (see FIG. 15a). As soon as the water (dyed blue) droplets within the emulsion contact the surface, the surface starts to reconfigure in order to expose the PEGDA chains. During surface reconfiguration, e.g., before the breakthrough of water, hexadecane (dyed red) is retained above the membrane due to oleophobicity of the membrane when in contact with air ($h_{breakthrough}=6.3$ cm).

For the separation apparatus shown in FIGS. 12a and 13a, a pressure applied due to a liquid column of height h and density p is $P_{applied}=\rho gh$. Breakthrough height $h_{breakthrough}$ is the height of the liquid column when the applied pressure is equal to the breakthrough pressure.

Separation of free oil and water is believed to be due to oleophobicity of the membrane in air. In this case, a breakthrough height of the oil column above the membrane can be obtained the following equation:

$$h_{breakthrough} = \frac{2R\gamma_{lv}}{\rho g D^2} \frac{(1-\cos\theta)}{(1+2(R/D)\sin\theta)}. \quad \text{(Equation 7)}$$

However, separation of hexadecane-in-water emulsions is believed to be due to oleophobicity of the membrane when submerged under water. In this case, a breakthrough height of the emulsion column above the membrane can be obtained using the following:

$$h_{breakthrough} = \frac{2R\gamma_{ow}}{\rho g D^2} \frac{(1-\cos\theta')}{(1+2(R/D)\sin\theta')}. \quad \text{(Equation 8)}$$

Separation of water-in-hexadecane emulsions is believed to be due to oleophobicity of the membrane both in air (before permeation of water) and when submerged under water (after permeation of water). In this case, Equations 7 and 8 predict two different breakthrough heights of the emulsion column above the membrane. The lower value of the two predicted breakthrough heights is believed to limit the operating height. These values can be compared for mesh 400 (R=12.5 µm, 2D=37.5 µm) coated with a 20 weight % fluorodecyl POSS and x-PEGDA blend that is used to separate water-in-hexadecane emulsions. For a PS-80 containing hexadecane mixture (estimated to be $\gamma_{lv}$=24.9 mN/m) on a surface spin-coated with a 20 weight % fluorodecyl POSS and x-PEGDA blend, the Young's contact angle is $\theta_{oil}$=70°. Using these values in Equation 7, when the membrane is in air, a predicted breakthrough height is $h_{breakthrough}$=6.3 cm. For the water-in-hexadecane emulsions, the contact angle is $\theta'_{oil}$=125° (inset in FIG. 15a) and $\gamma_{ow}$=3.7 mN/m. Using Equation 8, when the membrane is submerged under water, a predicted breakthrough height is $h_{breakthrough}$=2.4 cm, which is lower than the breakthrough height predicted by Equation 8. This predicted value for the breakthrough height matches well with the experimentally measured value for the breakthrough height $h_{breakthrough}$ of about 2.2 cm.

Thus, after surface reconfiguration, the water-rich permeate passes through the membrane while the hexadecane-rich retentate is retained above the membrane (see FIG. 15b). Hexadecane is retained above the membrane after the breakthrough of water due to the oleophobicity of the membrane when submerged under water ($h_{breakthrough}$=2.4 cm). It should be noted that the breakthrough pressure for hexadecane on a membrane submerged under water ($P_{breakthrough}$=198 Pa) is lower than that for hexadecane on a dry membrane ($P_{breakthrough}$=519 Pa).

Thermogravimetric analyses (see FIG. 15c) show that the permeate composition is approximately 99.9 weight % water, while the retentate composition is approximately 99.9 weight % hexadecane. This high separation efficiency is further confirmed by comparing the transmittance of the feed emulsions with that of the permeates, as well as, density measurements. Again, Karl Fischer analysis shows that the retentate composition is approximately 99.4 weight % hexadecane.

Example G

Data and images illustrating nearly complete separation of free oil-water mixture were described above and again in this example. FIG. 16a shows gravity-assisted CFDS of free rapeseed oil and water using a mesh 100 (2D=138 µm) coated with a 20 weight % fluorodecyl POSS and x-PEGDA blend. Water (dyed blue) is added to the upper tube (FIG. 16a), and immediately followed by rapeseed oil (dyed red, FIG. 16b). The corresponding insets in FIGS. 16a and 16b show a drop of water placed on a spin-coated surface of 20 weight % fluorodecyl POSS and x-PEGDA, and a drop of rapeseed oil immediately placed on top of the drop of water, respectively. When water contacts the membrane surface, the surface reconfigures to expose the PEGDA chains. Following the reconfiguration, water permeates through the membrane, while rapeseed oil is retained above the membrane (see FIG. 16c). The inset (ii) in FIG. 16c shows the drop of rapeseed oil with a contact angle of $\theta_{oil}$=45° on the corresponding spin-coated surface, previously wet by water. Thus, for rapeseed oil on the membrane, the robustness factor A*=3.2. Consequently, rapeseed oil is retained above the membrane.

A rapeseed oil column with a height h=1.2 cm is used, which is lower than the predicted breakthrough height $h_{breakthrough}$=1.3 cm of rapeseed oil to ensure a CFDS mode of separation occurs. Note that the inset (i) in FIG. 16c shows the underwater superoleophobicity of rapeseed oil ($\theta^*_{oil}$=152°) when in contact with mesh 100 dip-coated with 20 weight % fluorodecyl POSS and x-PEGDA.

It is observed that water permeates through the membrane at A*=1.25. Thus, the robustness factor may be used to provide an estimate of time required for free oil-water separation. The flux of water through the membrane (mesh 100; 2D=138 nm) is measured to be approximately 43,200 L/m²-hr. Oleophobicity of the membrane in air demonstrated here is believed to be important to achieve optimum free oil (rapeseed oil) and water separation.

In yet other embodiments, the porous separator materials of the present teachings can be used to separate miscible liquid from one another.

Example H

The utility of oleophobic, yet superhydrophilic surfaces is not limited to separation of oil from water. The following example shows the use of the inventive separator membranes to separate miscible liquids. This concept is readily extended to miscible systems and other systems including non-polar and polar liquid mixtures. The wetting behavior of a series of miscible alcohols with varying polarity (measured using dielectric constant, µ) and $\gamma_{lv}$ is shown in this example. FIG. 5 shows the wetting of ethanol (µ=24.3, $\gamma_{lv}$=21.9 mN/m, time of wetting (ToW)=12 min), butanol (µ=17.8, $\gamma_{lv}$=24.9 mN/m, ToW=115 min), cyclopentanol (µ=17.1, $\gamma_{lv}$=32.1 mN/m, ToW=430 min) and octanol (µ=10.3, $\gamma_{lv}$=27.1 mN/m, ToW>24 h) on ANTICON™ wipes coated with x-PEGDA and 20 weight % F-POSS, as described above in Example A. Comparing ethanol, butanol, and octanol, it is evident that the time of wetting increases with decreasing dielectric constant and comparing butanol and cyclopentanol it is evident that the time of wetting increases with increasing $\gamma_{lv}$ for similar dielectric constants. The differences in time of wetting can be exploited to separate immiscible non-polar and polar liquid mixtures such as alkane and alcohol mixtures. Further, on the same principles, the inventive materials can be used to separate certain miscible components from one another.

Thus, in various aspects, the present teachings provide highly effective and efficient methods of separating a liquid-liquid mixture by use of the inventive materials and devices described above. The methods may generally include contacting a liquid-liquid mixture with a superhydrophilic and oleophobic surface, optionally a superhydrophilic and superoleophobic surface, of a porous separator material prepared in accordance with the present teachings. Such contacting can occur with assistance of gravity feeding of the liquid-liquid mixture. In certain aspects, the liquid-liquid mixture comprises a first component present at an initial amount and a second component. In certain variations, the first component is immiscible with the second component. In yet other variations, the first component may be miscible with the second component. Notably, the liquid-liquid mixture is not limited to a binary system and may include other components. Further, the separations discussed herein may apply to separations of immiscible phases from one another, for example, the separation of a first aqueous phase optionally having multiple components from a second immiscible phase. The contacting of the liquid-liquid mixture with the porous material facilitates passage of the first component through the porous separator material.

The present disclosure further contemplates additional separation processes, for example, where a filtrate or effluent that passes through a first separator material is subsequently contacted with the same separator material or a second separator material to further enhance the separation of the desired components. Such a separations process may be continuous and may involve a multi-stage separator device including one or more porous separator materials prepared in accordance with the present disclosure having a superhydrophilic and oleophobic or superoleophobic surface. In certain variations, the contacting is conducted by gravity-feeding the liquid-liquid mixture to the superhydrophilic and superoleophobic surface of the porous separator material at ambient conditions, permitting capillary forces and gravitational forces to draw the first component through the separator material. The contacting may also be conducted by pressurizing the liquid-liquid mixture as it is fed to the membrane or pulling a vacuum on side of the membrane opposite to the liquid-liquid mixture, or under any other typical membrane separation pressure and temperature conditions known to those of skill in the separations art. As noted above, the contacting may also include gravity-feeding the liquid-liquid mixture to a second oleophilic and hydrophobic separator membrane, permitting capillary forces and gravitational forces to draw the second component through the second separator membrane.

In various aspects, the porous material prepared in accordance with the principles of the present disclosure provides a separated effluent comprising the first component that passes through the porous material in a separator device. The liquid-liquid mixture has a reduced amount of the first component (that becomes the separated effluent or filtrate passed through the separator membrane), as compared to an initial amount of the first component present in the liquid-liquid mixture prior to the contacting with the separator membrane. In certain aspects, a separation efficiency ($\eta$) for a given component can be expressed by $$\eta = 100 \times \left(\frac{x_i - x_f}{x_i}\right),$$

where $x_i$ is the initial amount (either mass or volume quantity) of a component and $x_f$ is the final amount of the component after the separation process has been completed. In various aspects, the inventive porous material has a separation efficiency (based on mass) of greater than or equal to about 20%, optionally greater than or equal to about 30%. In certain aspects, the separation efficiency is optimized to be greater than or equal to about 50%; optionally greater than or equal to about 75%; optionally greater than or equal to about 85%, optionally greater than or equal to about 90%, optionally greater than or equal to about 95%, optionally greater than or equal to about 97%, optionally greater than or equal to about 98%, in certain variations optionally greater than or equal to about 99%, in certain variations optionally greater than or equal to about 99.5%, optionally greater than or equal to about 99.95%, and in certain embodiments, may be greater than or equal to about 99.99%.

After passing through the porous material, the liquid-liquid mixture has a reduced amount of the first component (that becomes the separated effluent/filtrate passed through the separator membrane), as compared to an initial amount of the first component present in the liquid-liquid mixture prior to the contacting with the separator membrane. Thus, in certain aspects, the contacting process separates greater than or equal to about 85 weight % of the initial amount of the first component from the liquid-liquid mixture, optionally greater than or equal to about 90 weight %, optionally greater than or equal to about 91 weight %, optionally greater than or equal to about 92 weight %, optionally greater than or equal to about 93 weight %, optionally greater than or equal to about 94 weight %, optionally greater than or equal to about 95 weight %, optionally greater than or equal to about 96 weight %, optionally greater than or equal to about 97 weight %, optionally greater than or equal to about 98 weight %, optionally greater than or equal to about 99 weight %, optionally greater than or equal to about 99.5 weight %, optionally greater than or equal to about 99.9 weight %, and in certain aspects, optionally greater than or equal to about 99.99 weight % of the initial amount of the first component from the liquid-liquid mixture.

Further, in certain aspects, the amount of the first component that is retained in the liquid-liquid mixture (i.e., that does not pass through the porous material membrane) is less than or equal to about 15 weight %, optionally less than or equal to about 10 weight %, optionally less than or equal to about 7 weight %, optionally less than or equal to about 5 weight %, optionally less than or equal to about 3 weight %, optionally less than or equal to about 2 weight %, optionally less than or equal to about 1 weight %, optionally less than or equal to about 0.5 weight %, optionally less than or equal to about 0.1 weight %, optionally less than or equal to about 0.01 weight %, and in some embodiments, less than or equal to about 0.001 weight %, as compared to an initial amount of the first component present in the liquid-liquid mixture, prior to the contacting.

Further, in certain embodiments, where a second separator membrane is employed (for example, in a sidewall or along the bottom of a feeding chamber provided so as to pass the second component from the gravity fed liquid-liquid mixture), an amount of the second component that passes through the second membrane is greater than or equal to about 85 weight % of the initial amount of the second component from the liquid-liquid mixture, optionally greater than or equal to about 90 weight %, optionally greater than or equal to about 91 weight %, optionally greater than or equal to about 92 weight %, optionally greater than or equal to about 93 weight %, optionally greater than or equal to about 94 weight %, optionally greater than or equal to about 95 weight %, optionally greater than or equal to about 96 weight %, optionally greater than or equal to about 97 weight %, optionally greater than or equal to about 98 weight %, optionally greater than or equal to about 99 weight %, optionally greater than or equal to about 99.5 weight %, optionally greater than or equal to about 99.9 weight %, and in certain aspects, optionally greater than or equal to about 99.99 weight % of the initial amount of the second component from the liquid-liquid mixture.

Further, in such embodiments, the amount of the second component that is retained in the liquid-liquid mixture (i.e., that does not pass through the porous material membrane) is less than or equal to about 15 weight %, optionally less than or equal to about 10 weight %, optionally less than or equal to about 7 weight %, optionally less than or equal to about 5 weight %, optionally less than or equal to about 3 weight %, optionally less than or equal to about 2 weight %, optionally less than or equal to about 1 weight %, optionally less than or equal to about 0.5 weight %, optionally less than or equal to about 0.1 weight %, optionally less than or equal to about 0.01 weight %, and in some embodiments, less than or equal to about 0.001 weight %, as compared to an initial amount of the second component present in the liquid-liquid mixture, prior to the contacting.

Thus, in certain embodiments, the liquid-liquid mixture comprises water as the first component and one or more oils as a second component. While some conventional gravity separators can handle free and dispersed oil, they are not capable of continuously separating emulsifications of oil and water, as is provided by the inventive technology. When the porous material prepared in accordance with the present teachings is used as a separator membrane, it has a separation efficiency for a first component (such as water or an aqueous phase) of greater than or equal to about 85%, optionally greater than or equal to about 90%, optionally greater than or equal to about 91%, optionally greater than or equal to about 92%, optionally greater than or equal to about 93%, optionally greater than or equal to about 94%, optionally greater than or equal to about 95%, optionally greater than or equal to about 96%, optionally greater than or equal to about 97%, optionally greater than or equal to about 98%, optionally greater than or equal to about 99%, optionally greater than or equal to about 99.5%, and optionally up to about 100%, for separating water or an aqueous phase from a mixture of oil and water/aqueous components.

For example, the materials of the present disclosure can be used to achieve a water separation efficiency of greater than or equal to about 90% for separating water from an oil-in-water emulsion or from a water-in-oil emulsion (including those stabilized by one or more surface active agents), optionally greater than or equal to about 95%, optionally greater than or equal to about 99%, optionally greater than or equal to about 99.5%, optionally greater than or equal to about 99.9%, and is certain aspects, optionally greater than or equal to about 99.99%. This is true for mixtures where oil is a dispersed phase and water is a continuous phase and the oil droplets having an average size (diameter) of an oil droplet of greater than or equal to about 10 nm to less than or equal to about 100 μm, optionally greater than or equal to about 100 nm to less than or equal to about 20 μm, for example, in certain aspects having droplets of an average size of 500 nm (e.g., in an emulsion). In certain variations, the materials of the present disclosure can achieve a water separation efficiency of greater than or equal to about 91%, optionally greater than or equal to about 92%, optionally greater than or equal to 93%, optionally greater than or equal to about 94%, optionally greater than or equal to about 95%, optionally greater than or equal to about 96%, optionally greater than or equal to about 97%, optionally greater than or equal to about 98%, optionally greater than or equal to about 99%, optionally greater than or equal to about 99.5%, optionally greater than or equal to about 99.9%, and in certain embodiments, up to 100% when separating water from an oil-in-water emulsion or a water-in-oil emulsion.

In certain other embodiments, the present disclosure pertains to a liquid-liquid mixture having a first component and a second distinct component, where the first component is a first molecule having a first polarity and the second component is a second molecule having a second polarity. The first polarity of the first component is greater than the second polarity of the second component. In yet other embodiments, the present disclosure pertains to a liquid-liquid mixture having a first component and a second distinct component that are miscible (rather than immiscible like in the water-oil systems described above). For example, in certain embodiments, a liquid-liquid mixture comprises a first component and a second distinct component that are miscible with one another, but where the first component is a first molecule having a first polarity and the second component is a second molecule having a second polarity. In certain embodiments, the first component optionally comprises a polar molecule and the second component comprises a non-polar molecule. In certain variations, the polar component is an alcohol and the non-polar component is an alkane. In such embodiments, the porous separator material of the present disclosure separates greater than or equal to about 90 weight % of the initial amount of the first component from the liquid-liquid mixture, optionally greater than or equal to about 91 weight %, optionally greater than or equal to about 92 weight %, optionally greater than or equal to about 93 weight %, optionally greater than or equal to about 94 weight %, optionally greater than or equal to about 95 weight %, optionally greater than or equal to about 96 weight %, optionally greater than or equal to about 97 weight %, optionally greater than or equal to about 98 weight %, optionally greater than or equal to about 99 weight % up to 100 weight %.

The inventive technology provides new porous materials that exhibit oleophobic, yet superhydrophilic surfaces with a wide range of applicability to a variety of technologies. Such novel superhydrophilic and superoleophobic materials are particularly suitable for use as separator membranes, inter alia. In certain variations, the surfaces of the porous materials are superoleophobic and superhydrophilic. Such oleophobic and superhydrophilic surfaces can be employed in separating components from liquid-liquid systems, including systems having immiscible components like oil-water mixtures or in alternate aspects, miscible mixtures.

Furthermore, in certain aspects, the inventive materials are hygro-responsive coatings that reversibly turn superhydrophilic when contacted by water. In various aspects, the inventive membranes are able to sustainably maintain their oleophobicity both in air and when submerged under water. As a consequence, continuous separations unit operations are contemplated utilizing these membranes, which are able to separate free oil and water, oil-in-water emulsions, water-in-oil emulsions, and any combination of these phases to separation efficiencies in excess of 99%. Furthermore, in certain variations, the present disclosure contemplates a separations device using such materials as a separator membrane. In yet other aspects, the present disclosure provides an apparatus that utilizes two continuous separations unit operations in parallel, to achieve continuous, gravity-assisted separation of oil-in-water or water-in-oil emulsions with a separation efficiency exceeding 99.9%.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A separation device comprising:
a separator membrane having a porous material with a reconfigurable surface that is both superhydrophilic, having a first apparent advancing dynamic contact angle of less than or equal to about 5° when contacted with water, and oleophobic, having a second apparent advancing dynamic contact angle of greater than or equal to about 90° when contacted with a preselected oil,
wherein the separator membrane is capable of separating a liquid-liquid mixture comprising a first component that is polar and a second component that is non-polar,
wherein the porous material comprises a first material having a surface energy of less than or equal to about 25 mN/m and a second polymeric material that interacts with the first component via hydrogen bonding, electrostatic interaction, or dipole-dipole interaction,
wherein the separator membrane has a breakthrough pressure ($P_{breakthrough}$) above which the second component will pass through the separator membrane, the $P_{breakthrough}$ being greater than an applied pressure ($P_{applied}$) of the liquid-liquid mixture to the separator membrane so that the first component passes through the separator membrane when the liquid-liquid mixture is in contact therewith while the second component is retained and does not pass through the separator membrane, and wherein the reconfigurable surface is defined by reversible configurations which alternately expose the first material when contacted with the preselected oil and expose polymer chains of the second polymeric material when contacted with water.

2. The separation device according to claim 1, wherein the reconfigurable surface is both superhydrophilic and superoleophobic and the second apparent advancing dynamic contact angle is greater than or equal to about 150° when contacted with the preselected oil.

3. The separation device according to claim 1, wherein the reconfigurable surface has a re-entrant texture.

4. The separation device according to claim 3, wherein the oleophobicity of the reconfigurable surface is preselected and tuned by a robustness factor (A*) and a dimensionless spacing ratio (D*), wherein the robustness factor (A*) is a ratio of $P_{breakthrough}$ and a reference pressure ($P_{ref}$) expressed by $P_{ref}=2\gamma_{lv}/l_{cap}$, where $\gamma_{lv}$ is a surface tension of the liquid-liquid mixture and $l_{cap}$ is a capillary length of a liquid expressed by $l_{cap}=\sqrt{\gamma_{lv}/\rho g}$, where g is acceleration due to gravity and $\rho$ is a density of the liquid-liquid mixture, and the dimensionless spacing ratio (D*) measures an amount of air entrapped below a composite solid-liquid-air interface that is formed below a drop of the liquid-liquid mixture within the separator membrane, so that the separator membrane is in the Cassie-Baxter state.

5. The separation device according to claim 4, wherein the first component is water and the robustness factor A* for water is less than about 1.

6. The separation device according to claim 4, wherein the second component is oil and the robustness factor A* for oil is greater than 1 and the dimensionless spacing ratio D* is greater than about 1.

7. The separation device according to claim 1, wherein the porous material is selected from the group consisting of screen, mesh, paper, woven cloth, non-woven cloth, fabric, fiber, foam, molecular sieves, entangled nanowires, electrospun polymeric nanofibers, and combinations thereof.

8. A separation device comprising:
a separator membrane having a porous material with a reconfigurable surface that is concurrently superhydrophilic, having a first apparent advancing dynamic contact angle of less than or equal to about 5° when contacted with water and oleophobic having a second apparent advancing dynamic contact angle of greater than or equal to about 90° when contacted with a preselected oil,
wherein the porous material comprises a first material having a surface energy of less than or equal to about 25 mN/m and a second polymeric material that interacts with the first component via hydrogen bonding, electrostatic interaction, or dipole-dipole interaction, and
wherein the reconfigurable surface is defined by reversible configurations which alternately expose the first material when contacted with the preselected oil and expose polymer chains of the second polymeric material when contacted with water.

9. The separation device according to claim 8, wherein the second polymeric material is a charged polymeric material capable of electrostatically interacting with a charged moiety.

10. The separation device according to claim 9, wherein the second polymeric material comprises a polyelectrolyte.

11. The separation device according to claim 9, wherein the second polymeric material forms a coating on the reconfigurable surface.

12. The separation device according to claim 11, wherein the coating renders the surface hydrophilic.

13. The separation device according to claim 8, wherein the reconfigurable surface is superhydrophilic, having a first apparent advancing dynamic contact angle of less than or equal to about 5° when contacted with water, and superoleophobic having a second apparent advancing dynamic contact angle of greater than or equal to about 150° when contacted with a preselected oil.

14. The separation device according to claim 8, wherein the first material is a silsequioxane derivative.

15. The separation device according to claim 8, wherein the first material modifies the reconfigurable surface of the porous substrate to have a surface energy of greater than or equal to about 6 mN/m to less than or equal to about 25 mN/m at standard pressure and temperature conditions.

16. A separation device comprising:
a separator membrane having a porous material having a reconfigurable surface that is both superhydrophilic, having a first apparent advancing dynamic contact angle of less than or equal to about 5° when contacted with water, and oleophobic, having a second apparent advancing dynamic contact angle of greater than or equal to about 90° when contacted with a preselected oil;

wherein the separator membrane is capable of separating a liquid-liquid mixture comprising a first component that is polar and a second component that is non-polar, wherein the reconfigurable surface of the porous material has a re-entrant texture and is oleophobic by preselecting and tuning a robustness factor ($A^*$) and a dimensionless spacing ratio ($D^*$), wherein the porous material comprises a first material having a surface energy of less than or equal to about 25 mN/m and a second polymeric material that interacts with the second component via hydrogen bonding, electrostatic interaction, or dipole-dipole interaction, wherein the separator membrane has a breakthrough pressure ($P_{breakthrough}$) above which the second component will pass through the separator membrane, the $P_{breakthrough}$ being greater than an applied pressure ($P_{applied}$) of the liquid-liquid mixture to the separator membrane so that the first component passes through the separator membrane when the liquid-liquid mixture is in contact therewith while the second component is retained and does not pass through the separator membrane, and wherein the robustness factor ($A^*$) is a ratio of $P_{breakthrough}$ and a reference pressure ($P_{ref}$) expressed by $P_{ref}=2\gamma_{lv}/l_{cap}$, where $\gamma_{lv}$ is a surface tension of the liquid-liquid mixture and $l_{cap}$ is a capillary length of a liquid expressed by $l_{cap}=\gamma_{lv}/\rho g$, where g is acceleration due to gravity and $\rho$ is a density of the liquid-liquid mixture, and the dimensionless spacing ratio ($D^*$) measures an amount of air entrapped below a composite solid-liquid-air interface that is formed below a drop of the liquid-liquid mixture within the separator membrane, so that the separator membrane is in the Cassie-Baxter state, and wherein the reconfigurable surface is defined by reversible configurations which alternately expose the first material when contacted with the preselected oil and expose polymer chains of the second polymeric material when contacted with water.

17. A method of separating the liquid-liquid mixture with the separation device of claim 16, the method comprising:
contacting the liquid-liquid mixture with the reconfigurable surface that is both superhydrophilic and oleophobic, wherein the liquid-liquid mixture comprises a first component present at an initial amount and a second component, and the contacting facilitates passage of the first component through the separator membrane, so that the contacting separates greater than or equal to about 85 weight % of the initial amount of the first component from the liquid-liquid mixture.

* * * * *

UNITED STATES PATENT AND TRADEMARK OFFICE
CERTIFICATE OF CORRECTION

PATENT NO. : 10,220,351 B2
APPLICATION NO. : 14/939953
DATED : March 5, 2019
INVENTOR(S) : Anish Tuteja et al.

Page 1 of 1

It is certified that error appears in the above-identified patent and that said Letters Patent is hereby corrected as shown below:

On the Title Page

Column 1, item (71) Applicants, Lines 3-4, delete "The United States of America," and insert --The Government of the United States,-- therefor Column 1, item (71) Applicants, Line 6, delete "Washington, DC" and insert --Wright-Patterson Air Force Base, (OH)-- therefor Column 1, item (73) Assignees, Lines 2-3, delete "The United States of America," and insert --The Government of the United States,-- therefor Column 1, item (73) Assignees, Line 5, delete "Washington, DC" and insert --Wright-Patterson Air Force Base, (OH)-- therefor In the Claims Column 44, Claim 16, Line 2, delete "l$_{cap}$=γ$_{lv}$/ρg," and insert -- $l_{cap} = \sqrt{\gamma_{lv}/\rho g}$ -- therefor Signed and Sealed this
Second Day of July, 2019

Andrei Iancu
*Director of the United States Patent and Trademark Office*